(12) United States Patent
Gilboa

(10) Patent No.: US 7,463,263 B2
(45) Date of Patent: Dec. 9, 2008

(54) DECLARATIVE SPECIFICATION OF MODEL VISUALIZATIONS

(75) Inventor: Yuval Gilboa, Pardesiya (IL)

(73) Assignee: Sap Portals Israel Ltd., Ra'Anana (IL)

( * ) Notice: Subject to any disclaimer, the term of this patent is extended or adjusted under 35 U.S.C. 154(b) by 229 days.

(21) Appl. No.: 11/182,725

(22) Filed: Jul. 15, 2005

(65) Prior Publication Data

US 2007/0013697 A1    Jan. 18, 2007

(51) Int. Cl.
| | |
|---|---|
| G06T 17/00 | (2006.01) |
| G06T 11/20 | (2006.01) |
| G06F 15/80 | (2006.01) |
| G06F 15/177 | (2006.01) |
| G06F 15/173 | (2006.01) |
| G06F 9/44 | (2006.01) |
| G09G 5/00 | (2006.01) |
| G09B 19/00 | (2006.01) |
| G09B 7/00 | (2006.01) |

(52) U.S. Cl. .................. 345/440; 345/420; 345/505; 345/619; 434/219; 434/362; 709/220; 709/225; 717/104; 717/109; 717/113

(58) Field of Classification Search .................. 345/420, 345/440, 619, 505; 709/220, 225; 717/1, 717/104–109, 132, 113; 434/362, 219
See application file for complete search history.

(56) References Cited

U.S. PATENT DOCUMENTS

| | | | | |
|---|---|---|---|---|
| 6,064,409 | A * | 5/2000 | Thomsen et al. ............. 715/700 |
| 6,102,965 | A * | 8/2000 | Dye et al. .................... 717/109 |
| 6,138,270 | A * | 10/2000 | Hsu ............................. 717/125 |
| 6,173,438 | B1 * | 1/2001 | Kodosky et al. ............ 717/109 |
| 6,282,699 | B1 * | 8/2001 | Zhang et al. ................ 717/109 |
| 6,437,805 | B1 * | 8/2002 | Sojoodi et al. .............. 715/763 |
| 6,880,130 | B2 * | 4/2005 | Makowski et al. .......... 715/763 |
| 6,954,904 | B2 * | 10/2005 | White ......................... 715/763 |
| 6,971,065 | B2 * | 11/2005 | Austin ......................... 715/763 |
| 6,976,222 | B2 * | 12/2005 | Sojoodi et al. .............. 715/763 |
| 6,990,652 | B1 * | 1/2006 | Parthasarathy et al. ...... 717/107 |
| 7,000,190 | B2 * | 2/2006 | Kudukoli et al. ............ 715/763 |
| 7,017,123 | B2 * | 3/2006 | Chickles et al. ............. 715/816 |
| 7,024,631 | B1 * | 4/2006 | Hudson et al. .............. 715/763 |
| 7,028,222 | B2 * | 4/2006 | Peterson et al. ............... 714/38 |
| 7,043,693 | B2 * | 5/2006 | Wenzel et al. ............... 715/763 |
| 7,043,696 | B2 * | 5/2006 | Santori et al. ............... 715/771 |
| 7,058,899 | B2 * | 6/2006 | Petruk et al. ................ 715/763 |

(Continued)

OTHER PUBLICATIONS

UML 2.0 Diagram Intercharge Specification, ptc/03-09-01, Sep. 2003, (35 pages).

(Continued)

*Primary Examiner*—Ulka Chauhan
*Assistant Examiner*—Aaron M Guertin
(74) *Attorney, Agent, or Firm*—Buckley, Maschoff & Talwalkar LLC

(57) ABSTRACT

Techniques for generating a visual representation for a model representation in a manner whereby the model representation is not coupled to the visual representation. An abstract representation is generated based upon the model representation. Mapping rules are configured and used for generating the abstract representation from the model representation. A visual representation is then generated based upon the abstract representation.

21 Claims, 24 Drawing Sheets

U.S. PATENT DOCUMENTS

| | | | | |
|---|---|---|---|---|
| 7,069,517 B2 * | 6/2006 | Washington et al. | ........ | 715/763 |
| 7,076,740 B2 * | 7/2006 | Santori et al. | ............... | 715/771 |
| 7,120,874 B2 * | 10/2006 | Shah et al. | .................. | 715/733 |
| 7,120,876 B2 * | 10/2006 | Washington et al. | ........ | 715/763 |
| 7,120,877 B2 * | 10/2006 | Gabbert et al. | .............. | 715/804 |
| 7,134,081 B2 * | 11/2006 | Fuller et al. | ................. | 715/735 |
| 2002/0083413 A1 * | 6/2002 | Kodosky et al. | ............ | 717/109 |
| 2005/0095572 A1 * | 5/2005 | Comer et al. | ............... | 434/362 |

OTHER PUBLICATIONS

Unified Modeling Language: Diagram Interchange, version 2.0, pct/05-06-04, Jun. 2005 (41 pages).

* cited by examiner

```xml
<?xml version="1.0" encoding="Windows-1255" ?>
<GML xmlns:gml="core.gml" xmlns:ur="com.sap.rendering" xmlns:g="core.svg:GmlDrawing">
- <gml:Scenario id="BN" name="Scenario BN" modified="10/11/2004" version="1.0">
    - <gml:ScenarioUsage id="BV" name="Scenario T" target="T" g:pos="470 -30">  ◄──── 402
        <gml:Inplug id="BW" name="in1" portId="T.AT" dir="1" />
        <gml:Inplug id="BX" name="in2" portId="T.AX" dir="1" />
        <gml:Inplug id="BY" name="in3" portId="T.BB" dir="1" />
        <gml:Outplug id="BZ" name="out1" portId="T.BF" dir="2" />
        <gml:Outplug id="CA" name="out2" portId="T.BJ" dir="2" />
      </gml:ScenarioUsage>
    - <gml:ServiceUsage id="BP" name="Service F" target="F" g:pos="320 -85" g:size="80 80">
        <gml:Inplug id="BQ" name="in1" portId="F.H" dir="1" />
        <gml:Outplug id="BR" name="out1" portId="F.L" dir="2" />
        <gml:Outplug id="BS" name="out2" portId="F.P" dir="2" />
        <gml:Inplug id="BT" name="in2" portId="F.AJ" dir="1" />
        <gml:Outplug id="BU" name="out3" portId="F.AO" dir="2" />
      </gml:ServiceUsage>
    - <ur:FormView id="CJ" name="form1" g:pos="160 -100">  ◄──────── 404
        <gml:Infoshape id="CK" name="Infoshape CK" />
        <gml:Inplug id="CL" name="in" dir="1" />
        <gml:Outplug id="CM" name="out" dir="2" />
      </ur:FormView>
    - <ur:FormView id="DD" name="form2" g:pos="610 -30">
        <gml:Infoshape id="DE" name="Infoshape DE" baseId="T.BG" />
        <gml:Inplug id="DF" name="in" dir="1" />
        <gml:Outplug id="DG" name="out" dir="2" />
      </ur:FormView>
    - <ur:GridView id="CE" name="grid1" g:pos="470 -130">
        <gml:Infoshape id="CF" name="Infoshape CF" baseId="F.M" />
        <gml:Inplug id="CG" name="in" dir="1" />
        <gml:Outplug id="CH" name="out" dir="2" />
      </ur:GridView>
    + <gml:EventOutport id="DR" name="ev1" g:pos="705 30">
    + <gml:Inport id="CO" name="in1" g:pos="175 -20">
    + <gml:Outport id="CT" name="out1" g:pos="705 -140">
    + <gml:Outport id="DI" name="out2" g:pos="705 -40">
      <gml:BindLink id="CI" source="BR" target="CG" g:controls="13 7" g:path="h 35 v -50 h 28" />
      <gml:BindLink id="DH" source="BZ" target="DF" g:controls="11" g:path="h 53" />
      <gml:DataLink id="CB" source="BR" target="BW" g:controls="12 0" g:path="h 35 v 50 h 28" />
      <gml:DataLink id="CC" source="BS" target="BX" g:controls="12 0" g:path="h 28 v 50 h 35" />
      <gml:DataLink id="CD" source="BU" target="BY" g:controls="12 0" g:path="h 20 v 50 h 43" />
      <gml:DataLink id="CN" source="CM" target="BQ" g:controls="12 0" g:path="h 49 v 20 h 24" />
      <gml:DataLink id="CS" source="CQ" target="BT" g:controls="13 0" g:path="h 42 v -60 h 42" />
      <gml:DataLink id="CX" source="CH" target="CV" g:controls="11" g:path="h 173" />
      <gml:DataLink id="DM" source="DG" target="DK" g:controls="11" g:path="h 33" />
      <gml:DataLink id="DV" source="CA" target="DT" g:controls="12 -55" g:path="h 32 v 60 h 142" />
  </gml:Scenario>
</GML>
```

*FIG. 4*

```
Class ur:FormView inherit gml:Interactor;

metadata title   = 'Form View';
metadata descr   = 'Displays a dataset in a form view';

attach svg:Bipolar override {
    fillColor:    '#F2F5F8',
    strokeColor:  '#6183A9',
    textColor:    '#6183A9',
    ...

frameParts: [
        {type:'rect', x:'@x1', y:'@y1', width:'@w', height:'@h', rx:10,
                      fill:'@fillColor', stroke:'currentColor', 'stroke-width':2}
    ], bodyParts: [
        {type:'image', href:'@Class.metadata.icon32', x:-16, y:-12, width:32, height:32},
        {type:'text',  action:'rename', text:'@name', x:0, y:'@y1+12', 'font-size':'90%',
                       fill:'@textColor', stroke:'none', 'text-anchor':'middle'},
        {type:'text',  text:'(@tags ? "«"+@tags+"»" : "")', x:0, y:'@y2-5', 'font-size':'75%',
                       fill:'@textColor', 'text-anchor':'middle'}
```

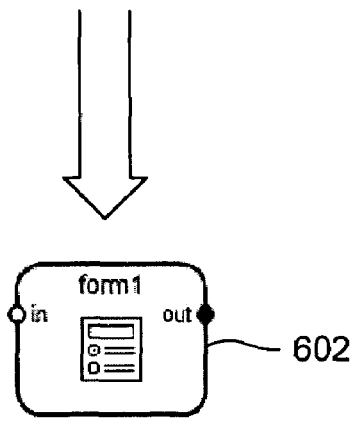

FIG. 6A

```
Class ServiceUsage inherit ComponentUsage;

metadata title = 'Service Usage';
metadata descr = 'A reference to a service diagram';

attach svg:Bipolar override {
    fillColor:    '#F3F7F7',
    strokeColor:  '#6F9B97',
    textColor:    '#6F9B97',
    ...

frameParts: [
        {type:'path', d:'JOIN("M", @x1, (@y1+10), "V", (@y2-10), "A10,2,0,0,0,", @x2, (@y2-10),'+
                         '"V", (@y1+10), "A10,2,0,0,0,", @x1, (@y1+10),"Z"),'+
                         '"M", @x1, (@y1+10), "A10,2,0,0,0,", @x2, (@y1+10))',
                  fill:'@fillColor', stroke:'currentColor', 'stroke-width':2},
        {type:'image', href:'#URL[svg-skin:images.shortcut.gif]',
                  x:'@x1+3', y:'@y2-20', width:11, height:11,
                  display:'@eval(base.isPrimary() ? "none" : "block")'}
    ], bodyParts: [
        {type:'text', action:'rename', text:'@name', x:0, y:'@w/6+16-@h/2', 'font-size':'90%',
                  fill:'@textColor', stroke:'none', 'text-anchor':'middle'},
        {type:'text', text:'(@tags ? "«"+@tags+"»" : "")', x:0, y:'@y2-7', 'font-size':'75%',
                  fill:'@textColor', 'text-anchor':'middle'}
    ]
}
```

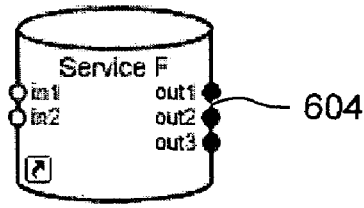

FIG. 6B

```xml
<?xml version="1.0" encoding="iso-8859-1" ?>
<!DOCTYPE svg (View Source for full doctype...)>
<svg zoomAndPan="disable" enableZoomAndPanControls="false" xmlns="http://www.w3.org/2000/svg"
    xmlns:xlink="http://www.w3.org/1999/xlink" preserveAspectRatio="xMidYMid meet" version="1.0" contentScriptType="text/ecmascript"
    contentStyleType="text/css">
- <svg preserveAspectRatio="xMidYMid meet" xmlns="http://www.w3.org/2000/svg" zoomAndPan="magnify" x="16" y="16" width="679"
    height="403" viewBox="-2 -166 679 403" xmlns:xlink="http://www.w3.org/1999/xlink" version="1.0" contentScriptType="text/ecmascript"
    contentStyleType="text/css">
  - <g id="ms__id261">
    - <g id="ms__id262">
       + <g transform="translate(150,10)">
       - <g transform="translate(300,20)">
         - <g color="#6F9B97">
            <path stroke="currentColor" stroke-width="2" d="M-40,-30 V30 A10,2,0,0,0,40,30 V-30 A10,2,0,0,0,-40,-30 Z M-40,-30
                A10,2,0,0,0,40,-30" fill="#F3F7F7" />
            <image xlink:href="/VCKits05/core.svg/res/skins/gm/images/shortcut.gif" width="11" height="11" sprite="false" x="-37"
                y="20" display="none" xmlns:xlink="http://www.w3.org/1999/xlink" xlink:type="simple" xlink:show="embed"
                xlink:actuate="onLoad" preserveAspectRatio="xMidYMid meet" />
         </g>
         - <g>
            <text pointer-events="none" action="rename" x="0" font-size="90%" stroke="none" text-anchor="middle" startOffset="0"
                y="-10.6667" fill="#6F9B97">Service F</text>
            <text pointer-events="none" x="0" font-size="75%" text-anchor="middle" startOffset="0" y="33" fill="#6F9B97" />
         </g>
         - <g>
            <rect x="-5" y="-5" width="10" height="10" transform="translate(-40 -5)" class="pinRect" />
            <circle cx="0" cy="0" r="3.25" style="fill:white;" color="#6F9B97" transform="translate(-40 -5)" class="pinIcon" />
            <text fill="#6F9B97" startOffset="0" transform="translate(-34 -2)" text-anchor="start" class="pinText">in1</text>
            <rect x="-5" y="-5" width="10" height="10" transform="translate(-40 5)" class="pinRect" />
            <circle cx="0" cy="0" r="3.25" style="fill:white;" color="#6F9B97" transform="translate(-40 5)" class="pinIcon" />
            <text fill="#6F9B97" startOffset="0" transform="translate(-34 8)" text-anchor="start" class="pinText">in2</text>
            <rect x="-5" y="-5" width="10" height="10" transform="translate(40 -5)" class="pinRect" />
            <circle cx="0" cy="0" r="3.25" style="fill:currentColor;" color="#6F9B97" transform="translate(40 -5)" class="pinIcon" />
            <text fill="#6F9B97" startOffset="0" transform="translate(34 -2)" text-anchor="end" class="pinText">out1</text>
            <rect x="-5" y="-5" width="10" height="10" transform="translate(40 5)" class="pinRect" />
            <circle cx="0" cy="0" r="3.25" style="fill:currentColor;" color="#6F9B97" transform="translate(40 5)" class="pinIcon" />
            <text fill="#6F9B97" startOffset="0" transform="translate(34 8)" text-anchor="end" class="pinText">out2</text>
            <rect x="-5" y="-5" width="10" height="10" transform="translate(40 15)" class="pinRect" />
            <circle cx="0" cy="0" r="3.25" style="fill:currentColor;" color="#6F9B97" transform="translate(40 15)" class="pinIcon" />
            <text fill="#6F9B97" startOffset="0" transform="translate(34 18)" text-anchor="end" class="pinText">out3</text>
         </g>
       </g>
       - <g transform="translate(450,60)">
         ...
         - <path fill="none" stroke="currentColor" color="#718398" stroke-width="1.25" stroke-dasharray="none" pointer-
             events="visibleStroke" marker-end="url(#FR_head)" d="M493.5,50h 43">
           - <marker id="FR_head" markerUnits="userSpaceOnUse" orient="auto" refX="8" refY="4" markerWidth="8" markerHeight="8"
                preserveAspectRatio="xMidYMid meet">
              <path d="M2.5,6.5 8,4 2.5,1.5 Z" style="fill:currentColor;stroke:currentColor;stroke-width:1" />
           </marker>
         </path>
         - <path fill="none" stroke="currentColor" color="#718398" stroke-width="1.25" stroke-dasharray="none" pointer-
             events="visibleStroke" marker-end="url(#FS_head)" d="M493.5,60h 22 v 60 h 22">
           - <marker id="FS_head" markerUnits="userSpaceOnUse" orient="auto" refX="8" refY="4" markerWidth="8" markerHeight="8"
                preserveAspectRatio="xMidYMid meet">
              <path d="M2.5,6.5 8,4 2.5,1.5 Z" style="fill:currentColor;stroke:currentColor;stroke-width:1" />
           </marker>
         </path>
       </g>
     </g>
     - <g stroke-width="1" stroke-dasharray="3.5">
        <g />
        <g />
        <rect visibility="hidden" style="visibility:visible;" x="0" y="0" width="0" height="0" class="wireframe" />
        <g />
     </g>
   </g>
  </svg>
</svg>
```

*FIG. 11*

DECLARATIVE SPECIFICATION OF MODEL VISUALIZATIONS

BACKGROUND OF THE INVENTION

The present invention relates to visualization of models, and more specifically to techniques for declaratively mapping a canonic model representation to one or more visual representations.

In the computing domain, information is commonly stored in the form of models. For example, a particular model may be used to store information for an application. The model may store information related to various entities or components of the application, information describing inputs or outputs of the components, information describing dependencies between the various components and their input and outputs, a component's response to signals, and other information for the application. The model that is used for storing information for an application may be configured by a designer of the application after taking into consideration various factors such as the domain in which the application is to be used, the memory resources available for storing the information, the computing resources available for processing the model, tools to be used for manipulating the model, and other factors. A model representation (also referred to as canonic model representation) thus provides a convenient way to persist information for an application in a machine-readable representation.

While a canonic model representation is the preferred form in which models are persisted and manipulated by software tools, it is not very well suited for human users, due to its usually technically verbose nature. Therefore, a model representation is usually transformed to a visual representation and the visual representation output to the user. The user may use the visual representation to comprehend the model information and also to manipulate or make changes. The visual representation thus provides a visual interface through which the user perceives and manipulates the model representation.

The transformation from a canonical model representation to a visual representation is usually performed by visualization tools (e.g., design tools) used by the user. These transformations depend on the graphics engine used by the tool to render the visual representation, on the characteristics of the output device used to output or display the visual representation, and other factors that are specific to the manner in which the visual representation will be displayed to the user.

Conventionally, such transformations from the model representation to the visual representation are hard-coded into the visualization tool implementation. The model representation is thus tightly coupled to the graphics engine of the renderer and the output device. Due to this tight coupling, many times, different model representations have to be provided for different renderers. As a result, it becomes very difficult to evolve visual representations to meet changing design-time needs, or to migrate visual representations between different visualization tools.

BRIEF SUMMARY OF THE INVENTION

Embodiments of the present invention provide techniques for generating a visual representation for a model representation in a manner whereby the model representation is not coupled to the visual representation. An abstract representation is generated based upon the model representation. Mapping rules are configured and used for generating the abstract representation from the model representation. A visual representation is then generated based upon the abstract representation.

According to an embodiment of the present invention, techniques are provided for generating a visual representation for a model representation. A set of one or more model elements may be identified in the model representation. An abstract representation may be generated for the model representation using a set of mapping rules, each mapping rule in the set of mapping rules providing a mapping of a model element type to a visual element type. The abstract representation may comprise a set of one or more visual elements and associated one or more properties, the set of visual elements determined based upon the set of model elements and the set of mapping rules. A first visual representation may be generated based upon the abstract representation, the first visual representation comprising a set of one or more graphic elements determined based upon the set of visual elements and their associated properties.

According to an embodiment, the abstract representation may be generated by identifying a first model element of a first type from the set of model elements, determining a first mapping rule from the set of mapping rules that maps the first type to a first visual element type, and creating a visual element of the first visual element type identified by the first mapping rule for the first model element.

In one embodiment, user input may be received indicating a change to the first visual representation. A change may be made to the abstract representation to reflect the change to the first visual representation. A change may also be made to the model representation based upon the change made to the abstract representation to reflect the change made to the first visual representation.

Different visual representations may be generated for different graphics engines. For example, a first visual representation may be generated for a first graphics engine using an abstract representation. The same abstract representation may be used to generate a second visual representation for a second graphics engine, wherein the second graphics engine is distinct from the first graphics engine. Generating the first visual representation may comprise determining one or more graphic elements for a first visual element from the set of visual elements based upon a type of the first visual element and one or more properties associated with the first visual element. Generating the first visual representation may comprise determining a graphics engine for outputting the first visual representation, and generating the first visual representation based upon the graphics engine. Examples of graphics engines include a scalable vector graphics engine, a vector graphics rendering engine, a Graphic Editing Framework engine, a Java2D graphics engine, a Flash graphics engine, an OpenGL graphics engine, and others.

The set of mapping rules that is used to generate the abstract representation may depend upon a type of the model representation. For example, a first set of mapping rules may be used for generating an abstract representation for a first type of model representation and a second set of mapping rules that are different from the first set of mapping rules may be used for generating the abstract representation for a second type of model representation.

According to an embodiment of the present invention, techniques are provided for generating visual representation where input is received identifying a model representation. The model representation may be processed to identify a set of one or more model elements. A set of mapping rules to be used for the model representation may be determined. Each mapping rule in the set of mapping rules may provide a mapping of a model element type to a pictogram type. Each model element in the set of model elements may be mapped to a pictogram using the set of mapping rules to generate a set of one or more pictograms. One or more properties associated with the one or more pictograms in the set of pictograms may be set. A visual representation may be generated based upon the set of pictograms and their associated properties, the visual representation comprising a set of one or more graphic elements. The visual representation that is generated may be output.

The foregoing, together with other features, embodiments, and advantages of the present invention, will become more apparent when referring to the following specification, claims, and accompanying drawings.

BRIEF DESCRIPTION OF THE DRAWINGS

FIG. 4 depicts a sample Visual Composer based model representation unit written in a particular modeling language called Visual Composition Language (VCL) according to an embodiment of the present invention;

FIGS. 6A and 6B show sample mappings of model elements to visual elements or pictograms according to an embodiment of the present invention;

FIG. 11 shows a partial listing of SVG markup that may be generated for rendering the visual representation depicted in FIG. 10 according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
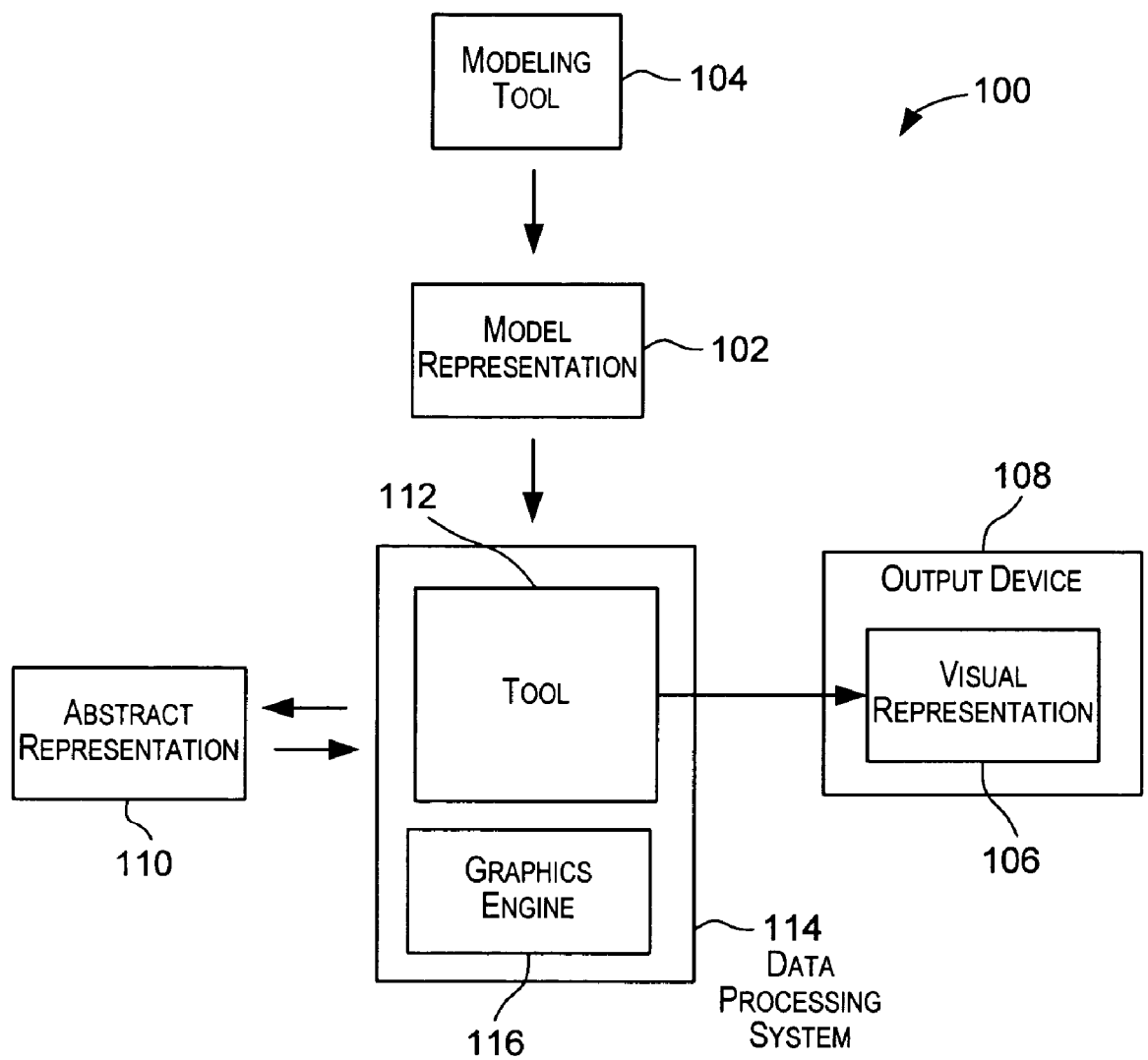
FIG. 1 depicts a simplified environment in which an embodiment of the present invention may be used.

Embodiments of the present invention provide techniques for generating a visual representation for a model representation in a manner whereby the model representation is not coupled to the visual representation. FIG. 1 depicts a simplified environment 100 in which an embodiment of the present invention may be used. As depicted in FIG. 1, a model representation 102 may be provided storing information for an application. Model representation 102 may be a machine-readable representation of an application or domain specific model. Model representation provides a form in which a model(s) is persisted and transported, and possibly handled by various tools such as code generators, runtime interpreters, analysis and validation tools, merge tools, and the like. In one embodiment, model representation 102 may be a collection of XML document with a well-formed syntax. Model representation 102 may have been generated using one or more modeling tools 104. Examples of modeling tools include Visual Composer provided by SAP AG of Germany, Rational Rose, Borland Together, Microsoft Visio, and others.

As previously described, a model representation is typically not very well suited for human users, due to its usually technically verbose nature. Accordingly, a visual representation 106 is usually generated for model representation 102 and possibly displayed using output device 108. Visual representation 106 represents a human-readable representation of the model representation and typically comprises a collection of graphical elements (also referred to as graphic primitives) such as boxes, circles, lines, etc. Visual representation is the form in which model representation 102 is presented to the user and possibly edited by the user. The visual representation enables the user to manipulate the manner in an intuitive manner.

According to the teachings of the present invention, model representation 102 is decoupled from visual representation 106 by providing an abstract representation 110. According to the teachings of the present invention, when a visual representation 106 is to be generated for a model representation 102, the model representation is first transformed into abstract representation 110 which is then used to generate visual representation 106. For example, a user may use a visualization tool 112 (e.g., a design tool) executing on a data processing system 114 to select a model representation and request display of a visual representation corresponding to the model representation. In response, the visualization tool may be configured to generate abstract representation 110 from model representation 102 and then use abstract representation 110 to generate visual representation 106 which may then be displayed or output to the user via output device 108. The generation of graphic primitives for visual representation 106 may depend on various factors such as graphics engine 116 used for rendering the visual representation, characteristics of output device 108, the target platform, and other factors. In some embodiments, the same tool may be used as the modeling tool and the visualization tool. An example of such as tool is Visual Composer provided by SAP. The abstract representation may also be generated by other entities/components other than tool 112.

Since the visual representation is generated based upon abstract representation 110 rather than model representation 102, the model representation 102 is decoupled from visual representation 106. The model representation itself may be of various forms or types depending on the tool/language used for the modeling. These various different model representations may be mapped to the abstract representation. Mapping rules may be provided for mapping a model representation to an abstract representation. Different mapping rules may be provided for mapping the various model representations to an abstract representation. As previously described, after an abstract representation has been generated for a model representation, the visual representation is generated based upon the abstract representation. Rules may be provided for converting an abstract representation to a particular type of visual representation, where the type of visual representation may depend on the graphics engine used for the rendering, characteristics of the output device, and other factors.

Figure 2:
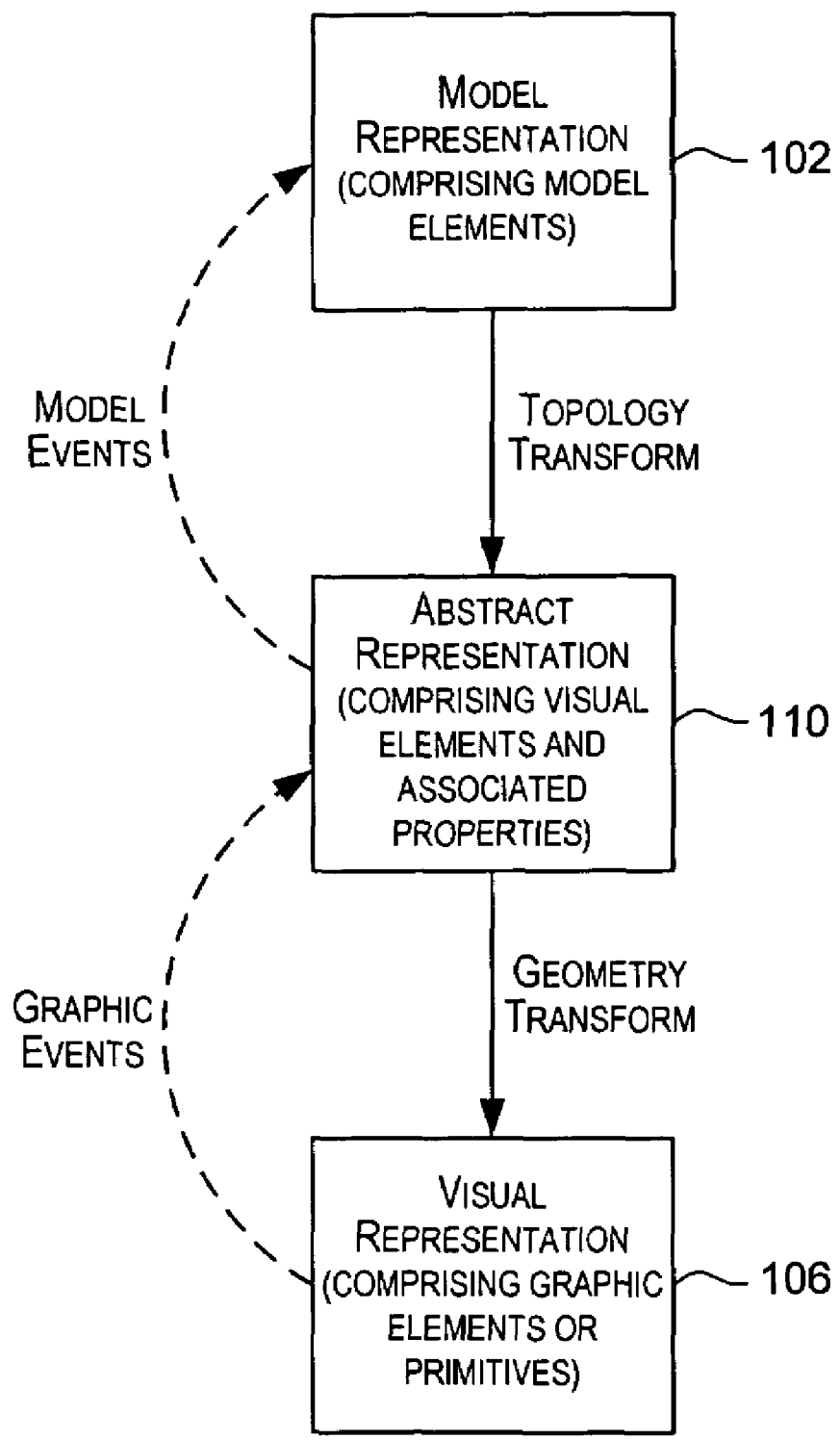
FIG. 2 depicts a process for mapping a model representation into a visual representation according to an embodiment of the present invention.

FIG. 2 depicts a process for mapping a model representation to a visual representation according to an embodiment of the present invention. Model representation 102 may comprise one or more model elements. Abstract representation 110 comprises one or more abstract visual elements (also referred to as pictograms) and properties associated with the abstract visual elements or pictograms. Visual representation 106 comprises one or more graphic elements or primitives such as boxes, circles, lines, etc. The graphic primitives generally depend on the graphics engine used for rendering the visual representation, the target platform, and characteristics of the output device.

As depicted in FIG. 2, the model elements of model representation 102 are mapped into abstract visual elements or pictograms using a topological transformation. The pictograms are then mapped into concrete graphic elements or primitives (e.g., boxes, lines) that make up the visual representation using a geometrical transformation. The mapping also works in the opposite direction. For example, low-level events triggered by the graphic primitives are captured by the abstract pictograms and transformed into generic model events that are used to update model representation 102. Accordingly, changes to the visual representation may be mapped back to the model representation.

The abstract representation comprising the pictograms thus creates an abstraction layer that decouples the model representation from the visual representation. Consequently, the model representation is no longer tied to or dependent on the graphics engine (such as Scalable Vector Graphics (SVG), vector graphics rendering (sometimes referred to as VML), Graphic Editing Framework (GEF) from Eclipse, Java2D, Flash, OpenGL, etc.) that is used to render the visual representation. The abstract representation can thus be ported between different design tool implementations. The same abstract representation may be used for different visual representations. The abstract representation also shields model designers from having to learn the intricate ins and outs of graphic engines. The model representation is no longer tied to the target platform or characteristics of the output device. By using only a small number of abstract pictograms, together with simple visual mapping rules, it is possible to produce virtually all the visual representations accepted in the industry today, such as Unified Modeling Language (UML), Visual Composition Language (VCL), entity-relationship diagrams (ERD), Business Process Execution Language (BPEL), Real-time Object-Oriented Modeling (ROOM), and others.

The pictograms encapsulate both appearance and behavior. Therefore, by mapping model elements to pictograms, one does not only specify how the elements will look like in the visual representation, but also how they will behave in reaction to events such as user gestures such as clicking, dragging, scrolling, etc.

Figure 3:
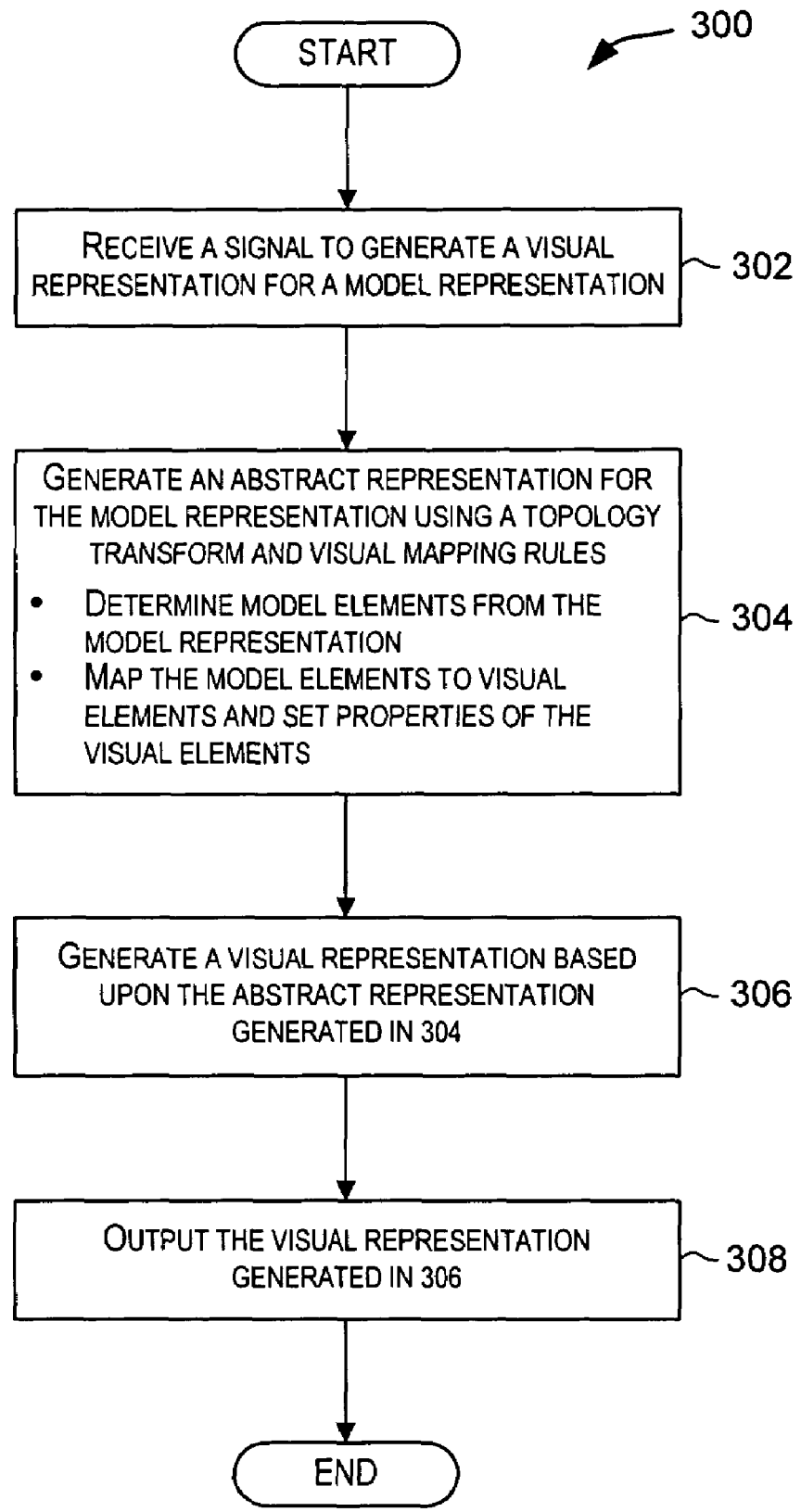
FIG. 3 depicts a simplified high-level flowchart showing a method for generating a visual representation for a model representation according to an embodiment of the present invention.

FIG. 3 depicts a simplified high-level flowchart 300 showing a method for generating a visual representation for a model representation according to an embodiment of the present invention. The processing depicted in FIG. 3 or a portion thereof may be performed by software (code modules or instructions) executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, processing may be initiated when a signal is received to generate a visual representation for a model representation (step 302). The signal may be generated for example when a user using a tool, such as Visual Composer provided by SAP, selects a particular model and requests information from the model to be displayed. Various other actions may also generate the signal in 302.

Visual mapping rules are then used to generate an abstract representation from the model representation using a topology transform, the abstract representation comprising abstract visual elements (also referred to as pictograms) and their associated properties (step 304). According to an embodiment of the present invention, as part of 304, one or more model elements are determined from the model representation. The visual mapping rules are then used to map the one or more model elements to one or more abstract visual elements (or pictograms) and set their associated properties.

The visual mapping rules specify the mapping between a model representation to an abstract representation. According to an embodiment of the present invention, visual mapping rules specify a mapping of model elements from a model representation to pictograms in the abstract representation. Each model element is mapped to a pictogram and appropriate properties set for the pictogram based upon the properties or attributes of the model element. One or more model elements may be mapped to a particular pictogram. Since multiple model elements may be mapped to the same pictogram, a relatively small number of pictograms may be used to generate the abstract representation for a model representation. Since there may be different types of model representations, different sets of visual mapping rules may be provided for mapping the model representation to the abstract representation (e.g., to map their corresponding model elements to pictograms).

According to an embodiment of the present invention, a visual mapping rule provides a mapping between a type of model element to a type of pictogram. Accordingly, in 304, when a particular model element of a particular type is identified in the model representation, a visual mapping rule that maps the particular type of model element to a particular type of pictogram is determined. The determined visual mapping rule is then used to map the model element to the pictogram of the particular type.

A visual representation is then generated based upon the abstract representation generated in 304 (step 306). In one embodiment, the abstract representation generated in 304 is mapped to a visual representation by applying geometrical transforms. As part of 306, a geometrical transform is applied to each pictogram determined in 304 to generate one or more graphic elements or primitives that make up the visual representation. The geometrical transformation process is also called rendering, and it largely depends on the graphics engine and the characteristics of the target display device. Typically, each pictogram is transformed into a set of one or more graphic elements or primitives according to the pictogram's type and properties. For example, in the Visual Composer tool from SAP, the rendering phase is implemented using the SVG graphics engine. Other design tools may be implemented using other graphic engines and thus may use different geometrical transformations, but the end result is usually substantially the same. Accordingly, as part of the processing performed in 306, the graphics engine to be used to output the visual representation is determined and the visual representation generated based upon and for that graphics engine. It is not expected or required that all geometric transformations produce exactly the same results, because the graphic engines usually differ on qualities such as geometric precision, anti-aliasing optimizations, text legibility, rendering speed, etc.

The visual representation generated in 306 may then be output to the user using an output device (step 308). For example, the visual representation may be displayed to the user on an output device such as a monitor. The visual representation may also be provided to other applications that may display the visual representation or use the visual representation for further processing.

The processing depicted in FIG. 3 and the features of embodiments of the present invention may be illustrated using an example based on the Visual Composer tool provided by SAP. It should be understood that the example described below is not intended to limit the scope of the invention as recited in the claims.

FIG. 4 depicts a sample Visual Composer based model representation unit written in a particular modeling language called Visual Composition Language (VCL) according to an embodiment of the present invention. The example below describes how this model representation is mapped into a visual representation that can be displayed in Visual Composer. It should be understood that the same principles may also be applied to any other model or visual representation that are employed by other design or display tools.

The model representation depicted in FIG. 4 comprises a number of model elements. Each model element in FIG. 4 is an instance of a corresponding VCL meta-model class. For instance: element 402 "Scenario T" (id=BV) is an instance of class "gml:ScenarioUsage", element 404 "form1" (id=CJ) is an instance of class "ur:FormView", and so forth. The model representation depicted in FIG. 4 includes approximately 20 model elements, which are instances of 10 different VCL classes.

The model elements are mapped to pictograms using mapping rules. Each mapping rule identifies a type (e.g., a particular class) of model element and the type of pictogram to which the model element maps to. When an instance of a particular class of model element is found in the model representation, a mapping rule is selected from the set of mapping rules that governs the mapping of that type of model element. The selected mapping rule is then used to create an instance of a pictogram of the type identified by the mapping rule. Different mapping rules may be provided for mapping different types of model representations to pictograms. Table A shown below depicts examples of mapping rules for mapping model elements from a model representation using UML 2.0 to pictograms.

TABLE A

UML 2.0 Mapping Rules

| UML2 Diagram | UML2 Element | Pictogram |
| --- | --- | --- |
| Class/Package/Object | Aggregation | OrthogonalLine |
| | Association | OrthogonalLine |
| | Class | Polyshape |
| | Composition | OrthogonalLine |
| | Dependency | Line |

TABLE A-continued

UML 2.0 Mapping Rules

| UML2 Diagram | UML2 Element | Pictogram |
| --- | --- | --- |
| | Generalization | OrthogonalLine |
| | InstanceSpecification | Polyshape |
| | Interface | Polyshape |
| | Package | Polyshape |
| | PackageExtension | Line |
| | PackageImport | Line |
| | Realization | OrthogonalLine |
| Component | Component | Polyshape |
| | Port | Polyshape |
| Composite | Collaboration | Polyshape |
| | CollaborationOccurrence | Polyshape |
| | Connector | Line |
| | RoleBinding | Line |
| Deployment | Artifact | Polyshape |
| | Dependency | Line |
| | DeploymentSpecification | Polyshape |
| | Generalization | OrthogonalLine |
| | Instantiation | OrthogonalLine |
| | Node | Polyshape |
| Interaction | ActionOccurrence | Polyshape |
| | CombinedFragment | Polyshape |
| | Coregion | Polyshape |
| | Frame | Group |
| | GeneralOrdering | Line |
| | InteractionOccurrence | Polyshape |
| | Lifeline | Progression |
| | Message | Line |
| | Stop | Polyshape |
| State | FinalState | Polyshape |
| | State | Group |
| | Transition | CurvedLine |
| UseCase | Actor | Polyshape |
| | Extend | Line |
| | ExtensionPoint | Polyshape |
| | Include | Line |
| | UseCase | Polyshape |

Table B shown below depicts examples of mapping rules for mapping model elements from a model representation using UML 2.0 DI to pictograms.

TABLE B

UML 2.0 DI Mapping Rules

| UML2DI Element | Pictogram |
| --- | --- |
| Diagram | Diagram |
| DiagramLink | Polyshape |
| GraphNode | Polyshape |
| GraphEdge | Line |
| GraphConnector | Anchor |

Table C shown below depicts examples of mapping rules for mapping model elements from a model representation using VCL 1.3 to pictograms.

TABLE C

VCL 1.3 Mapping Rules

| VCL Element | Pictogram |
| --- | --- |
| Diagram | N.A. |
| Component | PlanarDiagram |
| Scenario | PlanarDiagram |
| Service | PlanarDiagram |
| Module | PlanarDiagram |
| Element | N.A. |
| Connectable | N.A. |
| Configurable | N.A. |

TABLE C-continued

VCL 1.3 Mapping Rules

| VCL Element | Pictogram |
|---|---|
| Actor | N.A. |
| Interactor | Bipolar |
| Infoactor | Bipolar |
| Infoset | Bipolar |
| Port | N.A. |
| Inport | Unipolar |
| Outport | Unipolar |
| Usage | N.A. |
| ComponentUsage | Bipolar |
| ScenarioUsage | Bipolar |
| ServiceUsage | Bipolar |
| ModuleUsage | Polyshape |
| State | N.A. |
| CompositeState | Group |
| StateOR | Group |
| StateAND | Group |
| Field | N.A. |
| Infoshape | N.A. |
| Link | Line |
| BindLink | OrthogonalLine |
| DataLink | OrthogonalLine |
| NavigationLink | CurvedLine |
| Note | Textbox |
| Plug | N.A. |
| Inplug | Anchor |
| EventInplug | Anchor |
| Outplug | Anchor |
| EventOutplug | Anchor |

Figure 5:
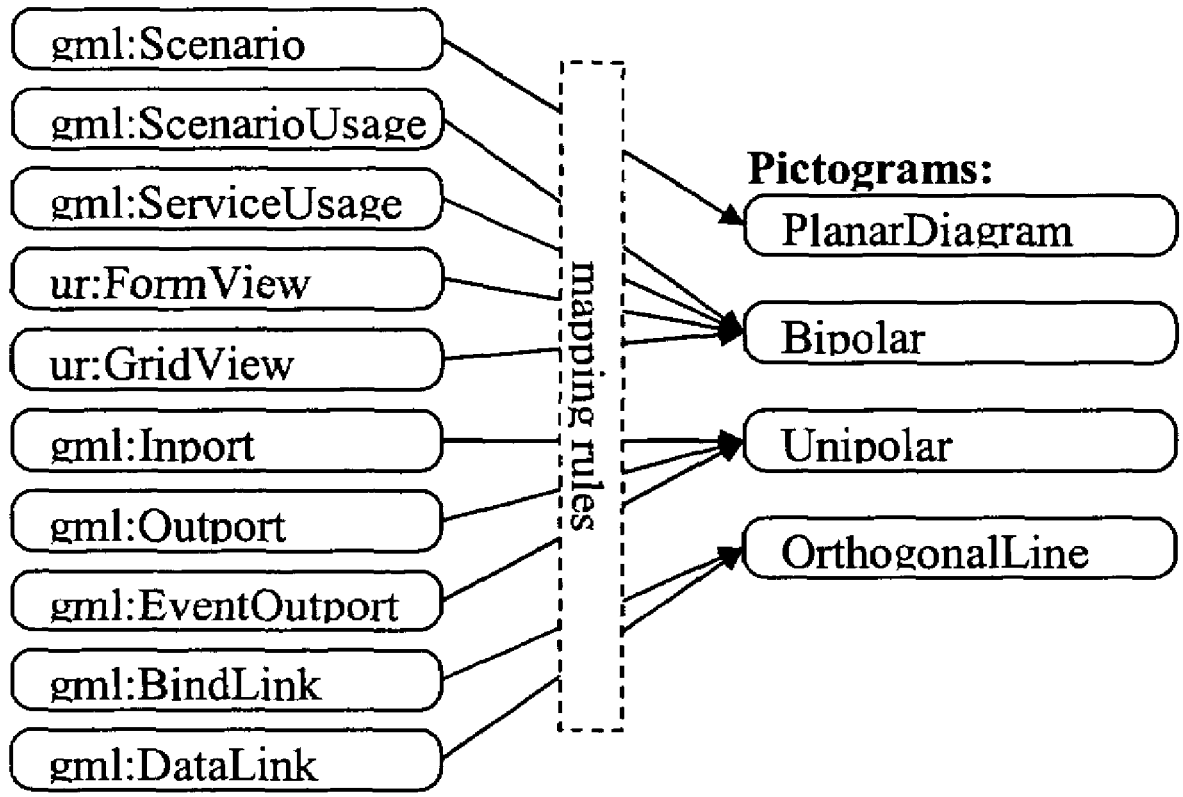
FIG. 5 depicts a sample mapping of VCL classes to different pictograms according to an embodiment of the present invention.

FIG. 5 depicts a sample mapping of the 10 VCL classes to 4 different pictograms. The mapping in FIG. 5 is performed using the mapping rules depicted in Table C. The mapping rules specify which pictogram is attached to which meta-model class or element. The cardinality of the mapping is one-to-many, i.e., the same pictogram can be attached to one or more classes or elements, but each class may be attached to at most one pictogram (in the same visual representation). Classes or elements that are not attached to pictograms may not be shown in the visual representation. The mapping rules also enable overriding the properties of the attached pictograms, to produce different graphic symbols for different meta-model classes. In this manner, a relatively small number of pictograms can be used for achieving a desired graphical notation.

In one embodiment in Visual Composer, the pictograms are implemented as GmlScript aspects. GmlScript is an object based programming language. In one embodiment, it is an extension of JavaScript that adds support for: namespaces and self-contained components (kits); classes, methods, and properties; aspects for aspect-oriented programming; prototypes for multiple inheritance; event and listeners for implementing dynamics and constraints; transactions for ensuring model consistency and for undo/redo; objects persistency; dynamic loading; introspection; self documentation; preprocessing pragmas; etc. In object-oriented programming, the natural unit of modularity is the class. GmlScript provides aspects which encapsulate behaviors that affect multiple classes in reusable modules. According to an embodiment of the present invention, an aspect is a special kind of class that can be attached to one or more regular classes. An aspect can be attached to one or more classes. All aspects attached to a class are implicitly attached also to its derived classes. The aspects implementing the pictograms are attached to their corresponding classes using "attach" statement in GmlScript. One sample mapping is depicted in FIG. 6A. The sample mapping in FIG. 6A produces a graphic primitive of a round rectangle 602 depicted in FIG. 6A. Another sample mapping is depicted in FIG. 6B. The sample mapping in FIG. 6B produces a graphic primitive of a round rectangle 604 depicted in FIG. 6B. Examples and description for GmlScript aspects is provided in U.S. Provisional Application No. 60/691,890 filed Jun. 16, 2005, the entire contents of which are herein incorporated by reference for all purposes.

The implementation of the pictograms, and the methods by which they are attached to meta-model classes or model elements, may vary in different implementations. Consequently, the mapping rules may be written using other formats (for example, using XMI and Xlink). But regardless of how the mapping rules are written, their contents remain the same, across all design tools that support a particular specification.

According to an embodiment of the present invention, a visual mapping rule defined on a meta-model class is inherited by all its derived sub-classes. This inheritance may be applied on two levels:

(1) A pictogram attached to a class is implicitly attached also to all its derived sub-classes. The pictogram inherited by a derived sub-class can be replaced with another pictogram by overriding the mapping rule.

(2) The pictogram properties defined by a mapping rule on a class are also inherited by all its derived sub-classes. The pictogram properties can be individually overridden on mapping rules defined on the derived sub-classes.

Figure 7:
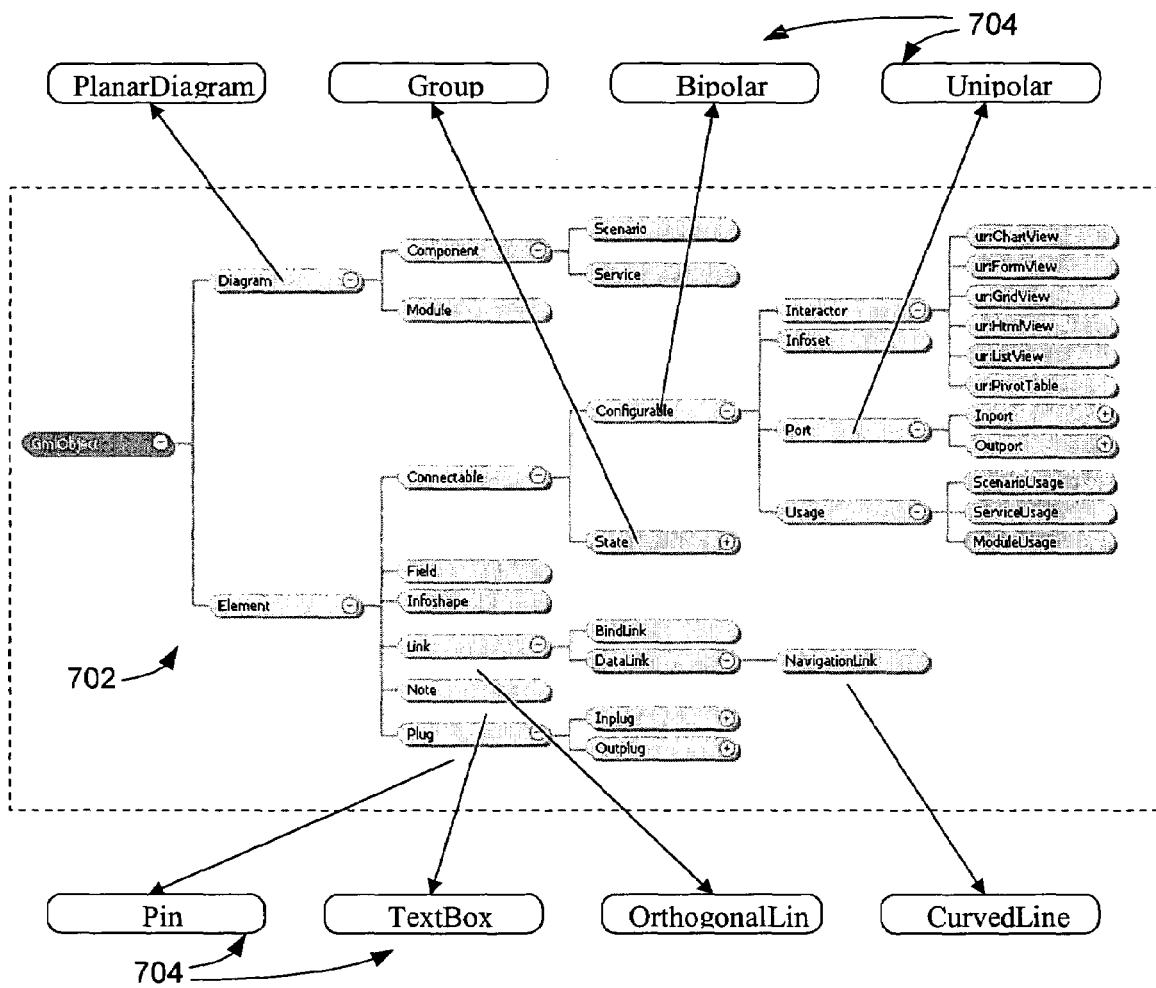
FIGS. 7 and 8 illustrate inheritance attributes associated with pictograms according to an embodiment of the present invention.

The first inheritance level is illustrated in FIG. 7 which shows a sample hierarchy of VCL meta-model classes 702 and their mapping to pictograms 704. As depicted in FIG. 7, a Configurable model class and all its derived model sub-classes such as Interactor, Infoset, Usage, and so on, are mapped to the Bipolar pictogram. However, the Port class overrides this mapping and is attached to the Unipolar pictogram instead. The new mapping is then inherited also by all sub-classes of Port, such as Inport and Outport.

Figure 8:
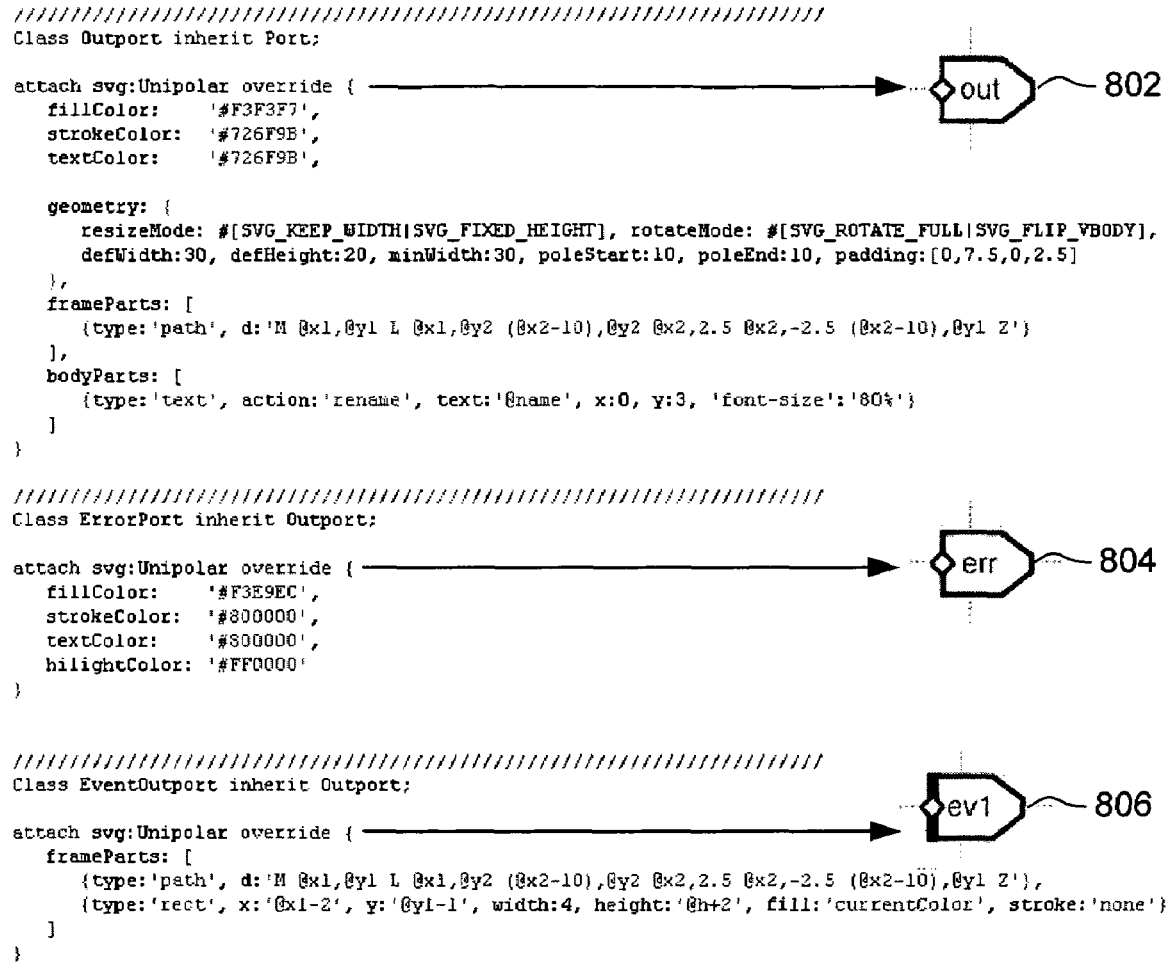

The second inheritance level is illustrated in FIG. 8. As depicted in FIG. 8, the Outport class is mapped to the Unipolar pictogram, and the properties are defined to produce the graphic symbol 802 shown in FIG. 8. The ErrorPort class is derived from Outport, and thus it inherits the mapping rule defined for Outport and the corresponding graphic symbol. The ErrorPort class overrides some of the color properties to change the color (denoted by change in fillColor value) of the graphic symbol and produces graphic symbol 804 shown in FIG. 8. The EventOutport class is also derived from Outport, and thus it inherits the same mapping rule and corresponding graphic symbol. The EventOutport class overrides just the frameParts property to change the frame of the graphic symbol to produce graphic symbol 806 shown in FIG. 8.

Figure 9:
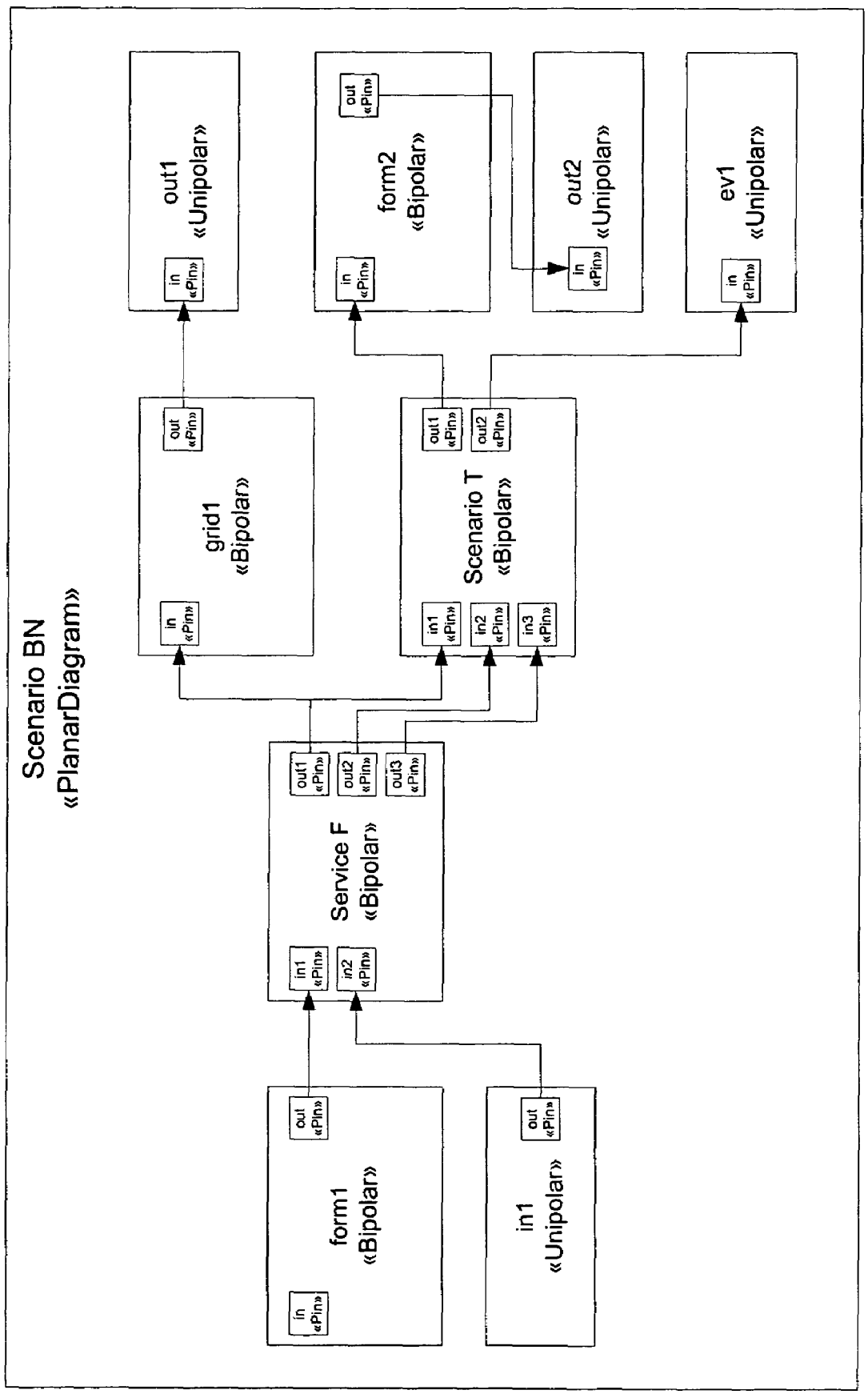
FIG. 9 illustrates an abstract representation generated for a sample model representation according to an embodiment of the present invention.

By recursively applying the visual mapping rules over all model elements in the model representation, the model representation is thereby transformed into an abstract visual representation consisting of pictograms and their mapped properties. FIG. 9 illustrates an abstract representation generated for the sample model representation depicted in FIG. 4 according to an embodiment of the present invention. The abstract visual representation comprises topological information, such as which pictogram instances exist, how they are nested, and how they are connected. According to an embodiment of the present invention, the topology is defined as follows:

Each model element instance is transformed into a corresponding pictogram instance, according to the mapping rule defined on its meta-model class. If no mapping rule is defined, then no pictogram will be instantiated.

Composite pictograms (pictograms that contain other pictograms) are defined by specifying the meta-model aggregation they represent.

Connector pictograms (pictograms that connect other pictograms) are defined by specifying the meta-model association they represent.

Generally, the topology of the abstract representation is isomorphic to the topology of the underlying model representation. Depending on the capabilities of the modeling framework and the design tool, more complex topology transformations may be achieved by specifying the aggregations and associations using dynamic views or queries of the model. Even if these dynamic capabilities are not available, then a static transformation step may be applied on the model representation to achieve the desired topology.

Figure 10:
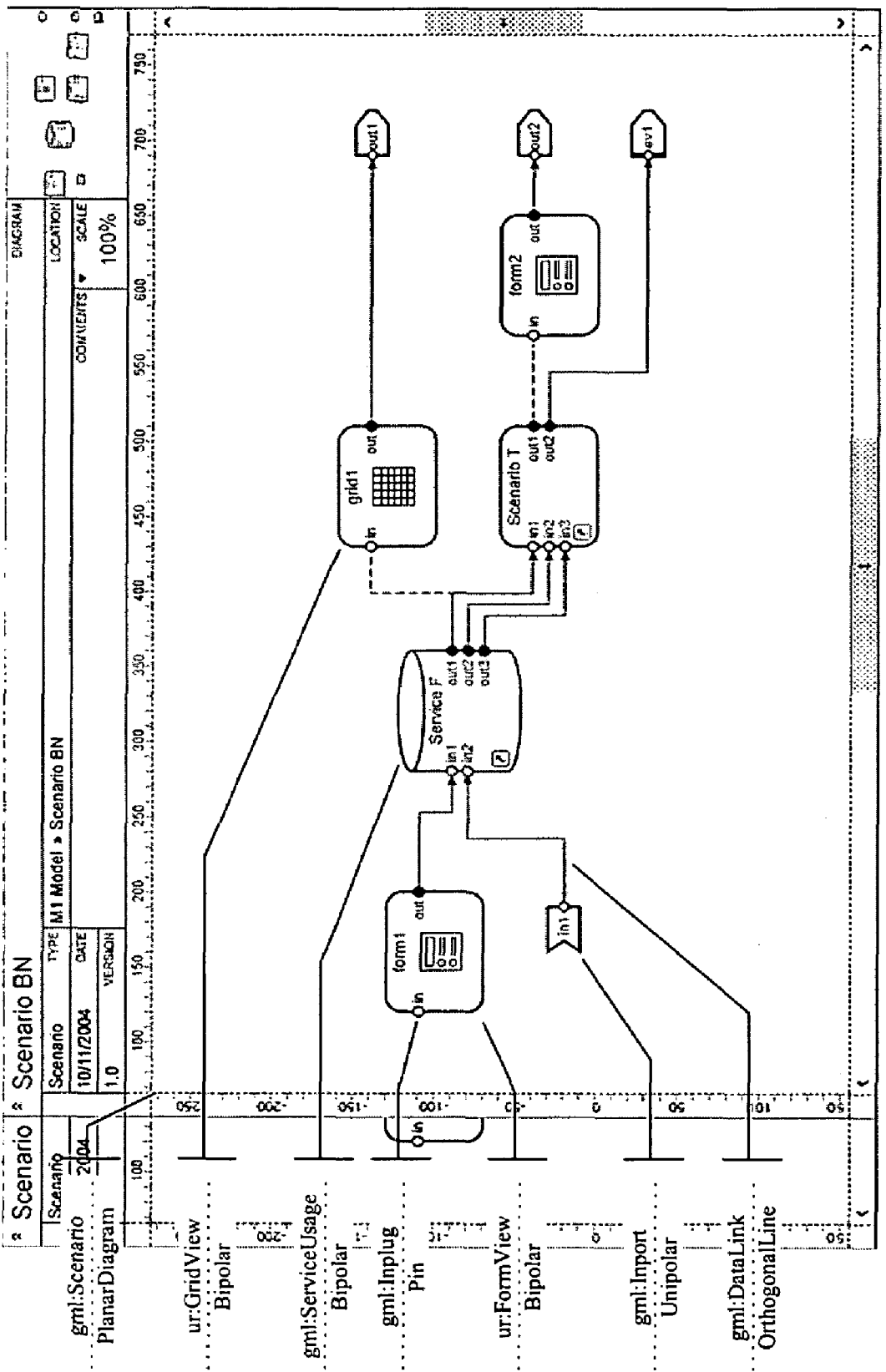
FIG. 10 depicts an example of a visual representation that may be produced based upon an abstract representation depicted in FIG. 9 according to an embodiment of the present invention.

The abstract representation is then used to generate the visual representation. As described above, this is done by generating a visual representation by applying a geometrical transformation on all the pictograms in the abstract representation. FIG. 10 depicts an example of a visual representation that may be produced based upon the abstract representation depicted in FIG. 9 according to an embodiment of the present invention. The geometrical transformation process is also called rendering, and it largely depends on the graphics engine and the characteristics of the target display device. Typically, each pictogram is transformed into a set of one or more graphic elements or primitives according to the pictogram's type and properties.

In a version of Visual Composer from SAP, the rendering phase is implemented using the SVG graphics engine. The listing in FIG. 11 shows a partial listing of the SVG markup that may be generated for rendering the visual representation depicted in FIG. 10 according to an embodiment of the present invention. The listing depicted in FIG. 11 shows that each pictogram is transformed into several SVG graphic primitives, resulting in a quite verbose SVG markup. Other design tools may be implemented using other graphic engines and may thus use different geometrical transformations, but the end result is usually substantially the same. All geometric transformations may not produce exactly the same results, because the graphic engines usually differ on qualities such as geometric precision, anti-aliasing optimizations, text legibility, rendering speed, etc. The mapping of pictograms to graphic primitives may be different in different implementations.

Most design tools enable a user to directly manipulate the visual representation by repositioning, resizing, or rotating elements, changing colors, adjusting bend points, and so on. To support direct manipulation, the visual mapping is used also in the other direction, namely from the visual representation back to the model representation. User gestures such as a mouse click, drag and drop, key press, etc. generate low-level graphic events, which are then captured and processed by the pictograms.

According to an embodiment of the present invention, the events may be classified into two categories:

(1) Drawing events: Drawing events affect only the visual representation. They are captured and handled directly by the pictograms, according to their prescribed behavior (e.g., moving, resizing, rotating, etc.) without affecting the underlying model representation.

(2) Semantic events: Semantic events affect the underlying model representation. They are captured by the pictograms and translated into generic events which are then propagated into the modeling framework where the actual handling will take place (for example, adding or removing elements, reconnecting or regrouping elements, etc.). The changes are stored in the model representation.

Figure 12:
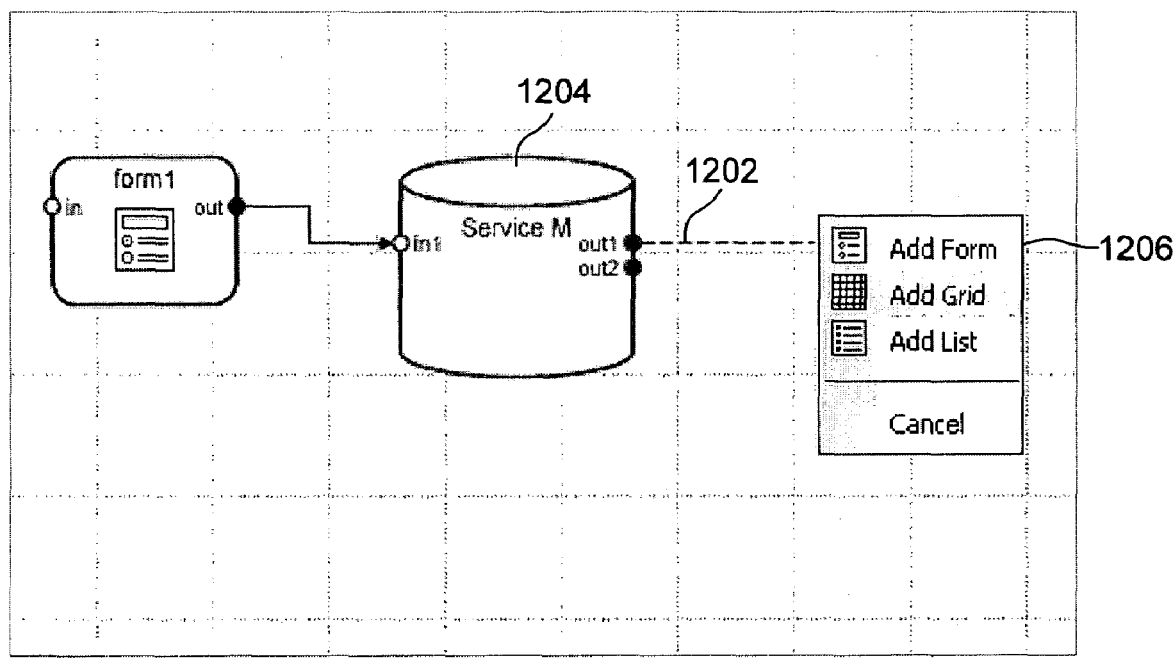
FIG. 12 depicts an example of a reaction to a type of event according to an embodiment of the present invention.

FIG. 12 depicts an example of a reaction to a semantic event called "quick-create". The event is generated when a user drags a connector line 1202 from "Service M" shape 1204, but then releases the mouse over an empty region of the canvas (instead of over a valid connection target). This gesture translates into a "quick-create" event, which by default does nothing. However, in this case the event is intercepted by the modeling framework and used for presenting the user with a popup menu 1206 containing the relevant model elements that can be created in this context.

Whenever the user directly manipulates the visual representation, the corresponding pictograms in the abstract representation are modified accordingly. These modifications are considered valuable user work and are persisted. The abstract representation may be persisted either inside the model's repository or beside it. The persistence of the abstract representation is done in a non-intrusive way. The method used for persisting the pictograms and their properties may depend and vary based upon the design tool. For example, in the case of Visual Composer, since the pictograms are implemented as aspects, their properties are persisted as aspect properties. The aspect properties are stored together with other properties of the model elements, but in their own separate namespace (see, for example, the properties with the g: prefix in FIG. 4). Other design tools may employ other methods for persisting the pictograms and their properties. For example, pictograms may be specified as a Meta-Object Facility (MOF)-compliant metamodel (details of MOF are available at www.omg.org), enabling pictogram instances to be stored in XMI files, and linked to the model files using XLink.

Pictograms Examples

Figure 13:
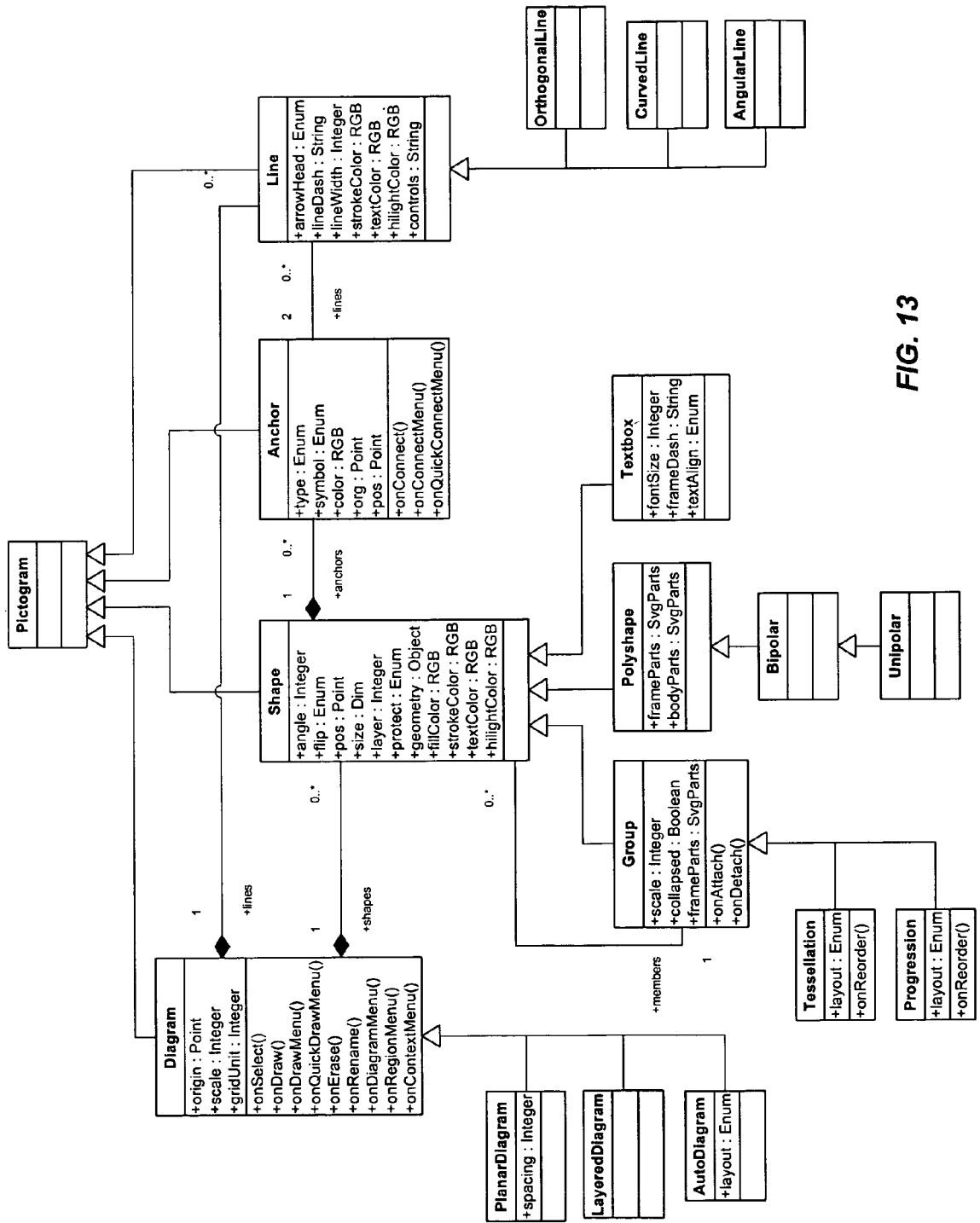
FIG. 13 depicts a metamodel diagram for a set of pictograms according to an embodiment of the present invention.

This section describes a set of pictograms according to an embodiment of the present invention. A predefined set of pictograms may be provided that constitutes the vocabulary from which the visual representation is constructed. FIG. 13 depicts a metamodel diagram for a set of pictograms according to an embodiment of the present invention. The metamodel diagram depicted in FIG. 13 shows a set of pictogram classes and their relationships. The pictogram properties and events are also shown in the second and third compartments of the pictogram classes, respectively. In the embodiment depicted in FIG. 13, the pictogram classes are classified into diagrams, shapes, groups, and lines. The pictogram metamodel depicted in FIG. 13 may be used to generate a variety of visual representations including but not restricted to VCL, UML, ROOM, ERD, and others.

Datatypes may be defined for the pictogram properties. Table D shown below identifies examples of datatypes that may be associated with pictogram properties according to an embodiment of the present invention.

TABLE D

Pictogram Property Datatypes

| Datatype | Description | Example |
| --- | --- | --- |
| String | A sequence of zero or more characters | "text string" |
| Integer | An integer value | 100 |
| Float | A floating-point value | 1.25 |
| Boolean | A true/false value | true |
| RGB | A color value encoded using #RRGGBB notation | #FF9900 |
| Point | A point (x y) expressed in logical units (user coordinates system) | 100 20 |
| Dim | A dimension (w h) expressed in logical units (user coordinates system) | 250 150 |

TABLE D-continued

Pictogram Property Datatypes

| Datatype | Description | Example |
|---|---|---|
| Enum | A value or values taken from a discrete set of allowed values (an enumeration). Multiple values are separated with a vertical-bar (\|) delimiter. | red\|green\|blue |
| Object | A structured value made of one or more fields | {min: 12, max: 30} |
| Formula | A simple expression that is dynamically evaluated during runtime (of the design tool) | @x + (@w − 10)/2 |

Some pictogram property values may be expressed using dynamic formulas. For example, in one embodiment, a dynamic formula may be a string containing a valid expression. In one embodiment, an executable GUI language (XGL) expression that involves one or more property references may be used. XGL is a generic executable specification of graphical user interfaces for business applications. XGL is a declarative specification language designed to serve as the common-ground between user interface modeling tools and a plurality of user interface runtime frameworks. It provides a self-contained, closed, and deterministic definition of all aspects of a graphical user interface in a device- and programming-language independent manner. An XGL expression has a simple structure and may be parsed and handled by any implementation. The XGL semantics are defined using an abstract model of a GUI framework. The XGL expression syntax is a subset of the expressions syntax used in the C-style family of programming languages (such as, Java, JavaScript, GmlScript, C++, and C#). Informally, an XGL expression is made of:

- String, Numeric, and Boolean literals
- Property references (using (prefix)
- Method invocations (using @ prefix)
- Arithmetic operators (+, −, *, /, %)
- Comparison operators (==, !=, <, <=, =>, >)
- Logical operators (!, \|\|, &&, ?:)
- Expression grouping (parentheses, ternary ?: operator, comma operator)
- A set of built-in macros (functions) that can be ported to any platform (e.g., UPPER, TRIM, LEN, MID, ABS, MAX, CEIL, SIN, COS, etc.).

According to an embodiment of the present invention, property references are written by adding the @ prefix to the property name (e.g., @fontSize). A formula may reference properties either on the pictogram itself, or on the underlying model object. Whenever a property value is modified, the design tool reevaluates all dependant pictogram formulas and adjusts the visual representation accordingly. For example, the following formula may be used to specify the path of a pictogram frame:

frame::JOIN("M", −@w/2, −@h/2, "L", −@w/2+7.5, "0", −@w/2, @h/2, @w/2, @h/2, @w/2, −@h/2, "Z")

The formula is reevaluated (and the frame visual primitive is accordingly redrawn), whenever the pictogram's size property is changed. For instance, if the pictogram's size is equal to {w:80, h:30}, then the formula evaluates to:

frame="M −40 −15 L −32.5 0 −40 15 40 15 40 −15 Z"

In case of ambiguous property names, the ! suffix may be added to distinguish model properties from pictogram properties. For example, if both a pictogram and its underlying model object contain a property named "text", then @text may be used to reference the property on the pictogram, and @text! may be used to reference the property of the model object.

Method invocations may also be written by adding the @ prefix to the method name (e.g., @method(args . . . )). The methods are invoked on the underlying model object. For example, the following formula may be used to determine whether to show or hide a pictogram part depending on a method return value:

display::@isPrimary( )?"none":"block"

Unlike property references, a method invocation does not expose any explicit dependencies in one embodiment. Accordingly, a formula containing only method invocations (no property references) is reevaluated only when the owning pictogram is fully repainted. In case the methods internally depend on property values, then these dependencies are made explicit using the -> operator. For example, the following formula invokes the getEventLabel method to get a formatted event name for display. The formula is reevaluated whenever the event, guard, or scope properties are modified (since these are the properties that internally affect the formatted event name):

text::@event, @guard, @scope->@getEventLabel( )

As described above, a set of one or more pictograms may be defined in order to facilitate generation of a visual representation from a model representation (and to make changes to the model representation when the visual representation is changed) in a manner that decouples the model representation from the visual representation. A few pictograms defined for an embodiment of the present invention and their associated properties are described below. These pictograms do not in any manner limit the scope of the present invention as recited in the claims.

Diagrams

The diagram is the drawing surface upon which the visual representation is drawn. The Diagram pictogram aggregates any number of Shape and Line pictograms, which are the visual elements that are actually drawn in a diagram. The diagram itself has no visual appearance (it is drawn as a white canvas). The diagram is infinite for each dimension of the coordinates space, but rendering occurs relative to a finite rectangular region of the diagram called the diagram's viewport. The viewport is defined by the diagram origin and scale properties. Whenever the user translates or magnifies the diagram viewport, these properties are updated to reflect the new viewport settings. The following diagram pictograms may be provided:

(1) Diagram

The Diagram pictogram is an abstract pictogram that has no layout and thus cannot be drawn. Concrete diagram pictograms are derived from Diagram by specifying a particular layout method.

Properties:

| | |
|---|---|
| origin | The diagram's viewport origin. |
| | Type: Point |
| | Default: {x: 0, y: 0} |
| | Access: read/write |
| scale | The diagram's viewport scale. |
| | Type: Integer |
| | Default: 100 |
| | Access: read/write |

-continued

| | |
|---|---|
| gridUnit | The diagram's grid unit.<br>Type: Integer (positive)<br>Default: 10<br>Access: read-only<br>Remarks: All coordinates of graphic shapes in the diagram are snapped (rounded) to the closest multiple of grid unit. |
| shapes | The diagram's shapes collection<br>Type: Formula<br>Default: (none)<br>Access: read-only<br>Remarks: A dynamic formula that evaluates to the collection of shape elements contained in this diagram. Typically, the formula is simply a reference to a corresponding collection property defined in the meta-model. The collection can also be defined dynamically by invocation of a query method. |
| lines | The diagram's lines collection<br>Type: Formula<br>Default: (none)<br>Access: read-only<br>Remarks: A dynamic formula that evaluates to the collection of line elements contained in this diagram. Typically, the formula will be simply a reference to a corresponding collection property defined in the meta-model. The collection can also be defined dynamically by invocation of a query method. |

(2) PlanarDiagram

A PlanarDiagram is a diagram drawn on a single plane with no overlapping shapes. Whenever the user moves or resizes a shape, all other shapes that become touched as a result are pushed away.

Properties:

| | |
|---|---|
| spacing | The minimum spacing to keep between any pair of shapes in the diagram.<br>Type: Integer<br>Default: 20<br>Access: read-only |

(3) LayeredDiagram

A LayeredDiagram is a diagram drawn as a collection of super-imposed layers. Each shape belongs to exactly one layer. Shapes in different layers can overlap. The user can control the visibility of individual layers.

(4) AutoDiagram

An AutoDiagram is a diagram with automatic layout. The diagram shapes are arranged according to the defined layout property. The user cannot control the arrangement of the shapes in an AutoDiagram.

Properties:

| | |
|---|---|
| layout | The layout method to use for arranging the diagram's shapes.<br>Type: Enum<br>Values: HIERARCHICAL<br>Access: read-only<br>Remarks: The layout method can be any one of the following values:<br><br>VALUE — DESCRIPTION<br>CIRCULAR — Emphasizes group structures by organizing shapes into recognizable clusters.<br>HIERARCHICAL — Reveals dependencies and flows in a diagram. Particularly effective for dataflow diagrams, process models and workflow diagrams.<br>ORTHOGONAL — Creates schematic representations using only horizontal and vertical line routing<br>SYMMETRIC — Emphasizes the symmetries inherent in a diagram by uniformly distributing shapes and lines. |

Shapes

A shape is an abstract element (pictogram) that occupies a finite, non-rectangular, region in the diagram. The shape's coordinates system is defined by the innermost group or diagram that contains the shape. All the geometric shape properties are defined relative to this coordinates system. The shape's bounding box is defined as the smallest rectangular region that completely contains the shape. The following pictograms may be provided as shapes:

(1) Shape

The Shape pictogram is an abstract pictogram that has no visual parts and thus cannot be drawn. Concrete shape pictograms are derived from Shape by adding specific visual parts that can be drawn.

Figure 14:
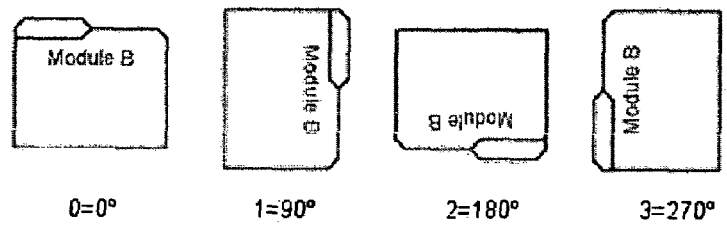
FIGS. 14, 15, 16, 17, 18, 19A, 19B, 20, 21, 22, 23, 24, 25, 26, 27, 28, 29, 30, 31, 32, 33, 34, and 35 illustrate examples of pictograms and/or associated properties according to an embodiment of the present invention.
Figure 15:
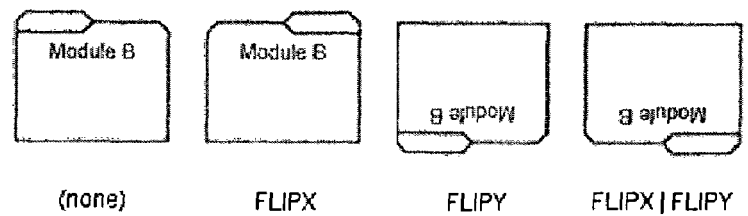

Properties:

| | |
|---|---|
| angle | The shape's rotation angle.<br>Type: Integer<br>Default: 0<br>Access: read/write<br>Remarks: The rotation angle is an even multiple of 90 degrees, as shown in FIG. 14. |
| flip | The shape's flip state<br>Type: Enum<br>Default: (none)<br>Access: read/write<br>Remarks: The flip state is any combination of the values shown in FIG. 15. |
| pos | The shape's center point<br>Type: Point<br>Default: {x: 0, y: 0}<br>Access: read/write<br>Remarks: The center point is also the point around which the shape is rotated. |

| | | |
|---|---|---|
| | | The center point's coordinates are relative to the shape's coordinates system. |
| | | The center point's coordinates are rounded to the nearest half of a grid unit so that the shape itself is maintained aligned to whole grid units. |
| size | The shape's width and height | |
| | Type: | Dim |
| | Default: | none (default size is established by the geometry constraints) |
| | Access: | read/write |
| | Remarks: | The specified size is independent of any rotation that may be applied on the shape. |
| | | The size is relative to the shape's coordinates system. |
| | | The width and height values are rounded to the nearest grid unit. |
| layer | The shape's layer number. | |
| | Type: | Integer |
| | Default: | 0 |
| | Access: | read/write |
| | Remarks: | The shape's layer defines its stacking order in layered diagrams. A shape with a higher layer number will be displayed on top of all shapes with a lower layer number. |
| protect | The shape's protection mode. | |
| | Type: | Enum |
| | Default: | NONE |
| | Access: | read/write |
| | Remarks: | Use this property to protect the shape from user interaction. The protection mode is any combination of the following values: |

| VALUE | DESCRIPTION |
|---|---|
| NONE | Do not protect the shape from any user interaction |
| NOMOVE | Protect the shape from moving |
| NORESIZE | Protect the shape from resizing |
| NOROTATE | Protect the shape from rotating |
| NOFLIP | Protect the shape from flipping |
| NOTRANSFORM | Protect the shape from all transformations |
| NOSELECT | Protect the shape from selection |

| | | |
|---|---|---|
| fillColor | The shape's fill color | |
| | Type: | RGB |
| | Default: | #F5F5F5 |
| | Access: | read/write |
| | Remarks: | The fill color is the default color used for filling the shape |
| strokeColor | The shape's stroke color | |
| | Type: | RGB |
| | Default: | #718398 |
| | Access: | read/write |
| | Remarks: | The stroke color is the default color used for drawing the shape's contour |
| textColor | The shape's text color | |
| | Type: | RGB |
| | Default: | #546374 |
| | Access: | read/write |
| | Remarks: | The stroke color is the default color used for the shape's text |
| highlightColor | The shape's highlight color. | |
| | Type: | RGB |
| | Default: | #FF9933 |
| | Access: | read/write |
| | Remarks: | The highlight color is the color used for highlighting the shape when the mouse is moved over it |

Figure 16:
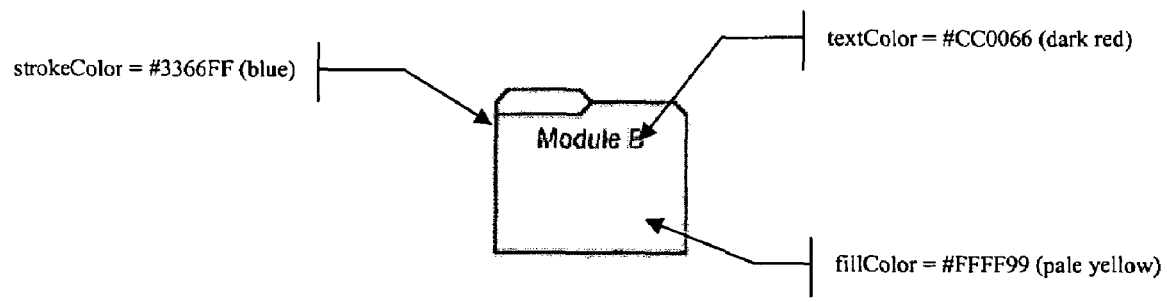

FIG. 16 illustrates various shape colors according to an embodiment of the present invention.

Figure 17:
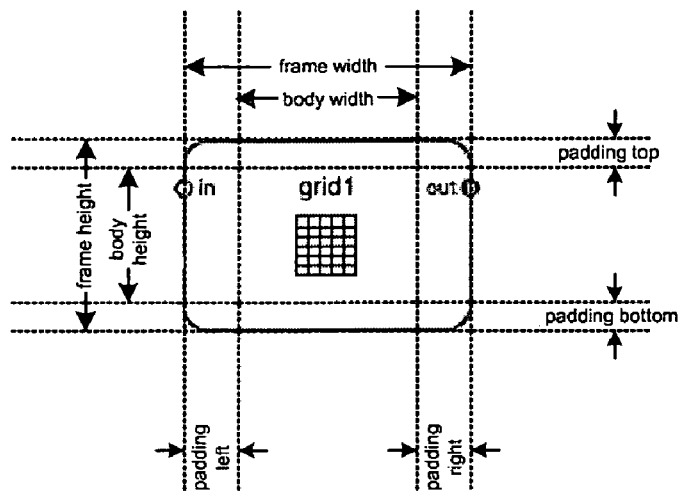

| | | |
|---|---|---|
| geometry | The shape's geometry constraints. Example depicted in FIG. 17. | |
| | Type: | Object |
| | Default: | { ... } |
| | Access: | read-only |
| | Constraints: | The geometry property defines the shape's geometrical constraints using the following structure: |

-continued

| | CONSTRAINT | DESCRIPTION |
|---|---|---|
| | resizeMode | Shape resizing mode (see below) |
| | rotateMode | Shape rotating mode (see below) |
| | defWidth | Default frame width |
| | minWidth | Minimum frame width |
| | maxWidth | Maximum frame width |
| | defHeight | Default frame height |
| | minHeight | Minimum frame height |
| | maxHeight | Maximum frame height |
| | padding | An array of four numbers [top, right, bottom, left] specifying the distances to use for padding the corresponding shape edges. Padding is ignored on fixed-size shapes. |
| Resizing: | The shape resizing mode can be constrained by setting the resizeMode field to combinations of the following values | |
| | RESIZE MODE | DESCRIPTION |
| | FREE_RESIZE | Shape's size can be freely changed, while still honoring the other constraints (default). |
| | FIXED_WIDTH | Width is fixed to defWidth |
| | AUTO_WIDTH | Width is automatically set equal to the body's width |
| | KEEP_WIDTH | Width is kept greater or equal to the body's width |
| | FIXED_HEIGHT | Height is fixed to defHeight |
| | AUTO_HEIGHT | Height is automatically set equal to the body's height |
| | KEEP_HEIGHT | Height is kept greater or equal to the body's height |
| Rotating: | The shape rotating mode can be constrained by setting the rotateMode field to combinations of the following values: | |
| | ROTATE MODE | DESCRIPTION |
| | FREE_ROTATE | The shape can be freely rotated and flipped in all directions (default). |
| | ROTATE_0 | The shape can be rotated to 0° |
| | ROTATE_90 | The shape can be rotated to 90° |
| | ROTATE_180 | The shape can be rotated to 180° |
| | ROTATE_270 | The shape can be rotated to 270° |
| | FLIPX | The shape can be flipped horizontally |
| | FLIPY | The shape can be flipped vertically |
| | FLIP_BODY | Flips the body contents together with the shape |
| | FLIP_VBODY | Flips the body contents together with the shape, but only if the shape is oriented vertically (90° or 270°) |
| | FLIP_UPSIDE | Flips or rotates the body contents to ensure they are always oriented upside, regardless of the shape's orientation |
| anchors | The shape's anchors collection | |
| Type: | Formula | |
| Default: | (none) | |
| Access: | read-only | |
| Remarks: | A dynamic formula that evaluates to the collection of anchor elements contained in this shape. Typically, the formula will be simply a reference to a corresponding collection property defined in the meta-model. The collection can also be defined dynamically by invocation of a query method. | |

A shape pictogram may also have computed properties. Computed shape properties are virtual properties that are automatically recomputed by the shape pictogram. The computed properties are not persisted, but they can be used in dynamic formulas just like any other pictogram property. Examples include:

| PROPERTY | DESCRIPTION | COORDINATES SYSTEM |
| --- | --- | --- |
| ox | The shape's coordinates system x-origin | diagram |
| oy | The shape's coordinates system y-origin | diagram |
| os | The shape's coordinates system scale | diagram |
| cx | The shape's center x-coordinate | shape |
| cy | The shape's center y-coordinate | shape |
| w | The shape's width | shape |
| h | The shape's height | shape |
| x1 | The shape's left x-coordinate | shape |
| x2 | The shape's right x-coordinate | shape |
| y1 | The shape's top y-coordinate | shape |
| y2 | The shape's bottom y-coordinate | shape |

Figure 18:
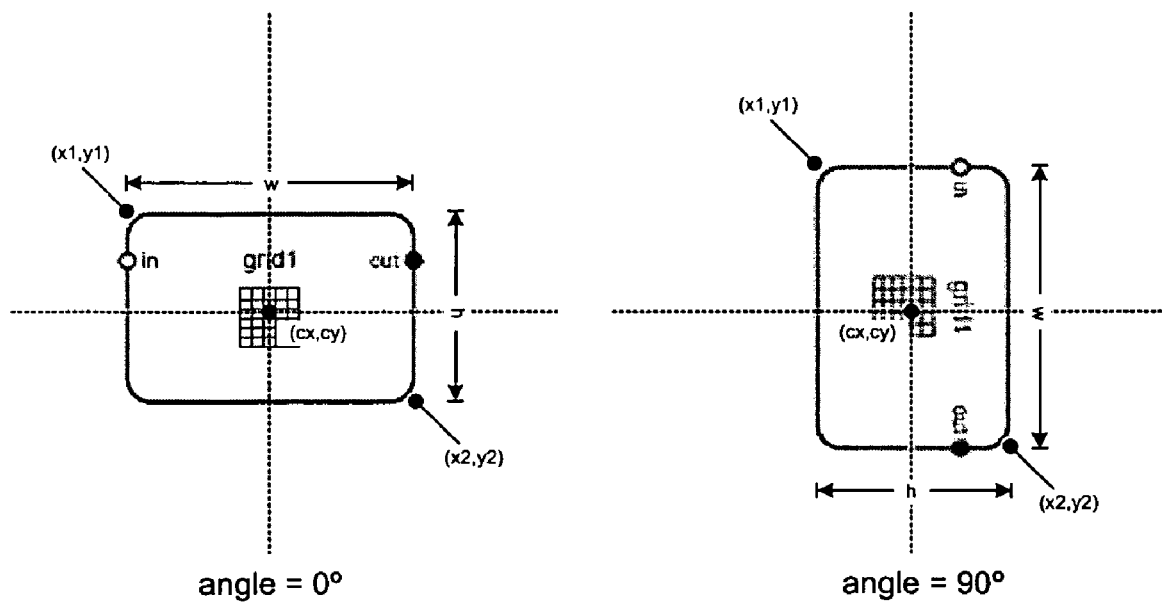

While the shape's center position (cx,cy) and size (w,h) are not affected by the rotation angle, the shape's bounding box (x1,y1,x2,y2) always depend on the rotation angle. This is illustrated in FIG. 18.

(2) Polyshape

A Polyshape is a shape composed of one or more visual parts (hence the name).

Properties:

| frameParts | The shape frame's parts | |
| --- | --- | --- |
| | Type: | SvgParts |
| | Default: | { } |
| | Access: | read-only |
| | Remarks: | Use this property to define the graphical parts that draw the shape's frame. The frame parts do not contribute to the shape's size during auto-size calculations. Therefore, frame parts can be defined using dynamic formulas that depend on the shape's size (frame parts defined in this way will be adjusted whenever the shape's size changes). |
| bodyParts | The shape body's parts | |
| | Type: | SvgParts |
| | Default: | { } |
| | Access: | read-only |
| | Remarks: | Use this property to define the graphical parts that draw the shape's contents. The bounding box of the body parts defines the shape's size during auto-size calculations. Therefore, body parts cannot be defined using dynamic formulas that depend on the shape's size (since this would result in cyclic dependencies). |

Figure 19A:
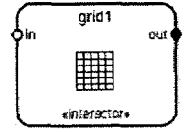
Figure 19B:
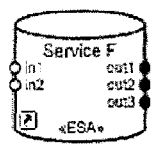

SvgParts: The SvgParts structure is an array of shape part definitions, each defined using a single SVG graphic element. For each shape part, the type attribute defines the type of SVG element that will be created. Only the basic SVG element types are allowed, to enable compatibility with any graphics engine. Specifically, the examples of allowed types are: rect, circle, ellipse, line, polyline, polygon, path, text, and image. The remaining attributes are visual attributes specific to the SVG element selected by the type attribute. See the SVG 1.1 Specification (www.w3.org/TR/2003/REC-SVG11-20030114) for the full description of the SVG elements and their visual attributes, the entire contents of this specification are herein incorporated by reference for all purposes. All shape part attributes (except for type) can be expressed using dynamic formulas. FIGS. 19A and 19B illustrate how various frame and body SvgParts are mapped to the visual representation.

(3) Bipolar

Figure 20:
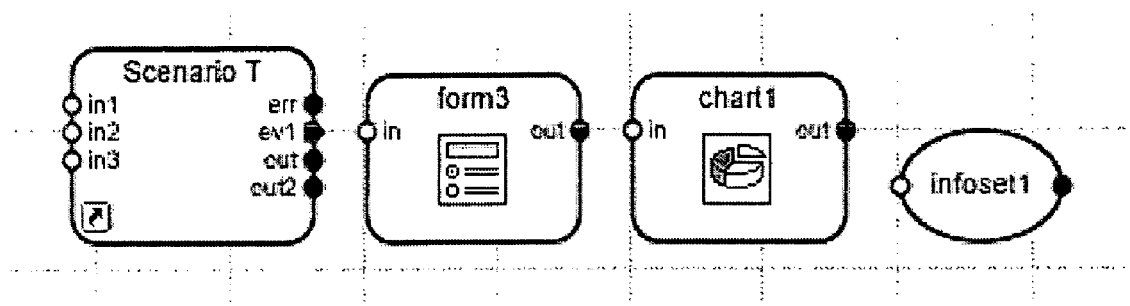

A Bipolar pictogram is a Polyshape containing input and output anchor pins. The input/output pins are automatically arranged on two opposite shape sides (poles), and the shape is automatically resized to accommodate all pins. Bipolar shapes are typically used in orthogonal layouts. Examples are depicted in FIG. 20.

(4) Unipolar

Figure 21:
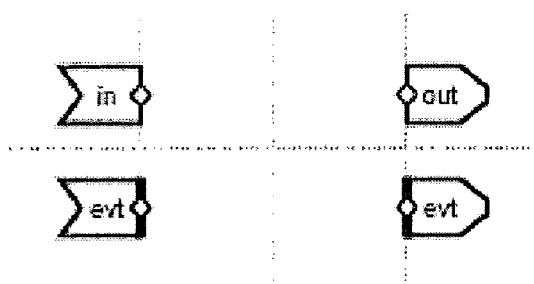

A Unipolar pictogram is a Polyshape containing either input or output anchor pins. The input or output pins are automatically arranged on one of the shape's sides (pole), and the shape is automatically resized to accommodate all pins. Unipolar shapes are typically used in orthogonal layouts. Examples are depicted in FIG. 21.

(5) Textbox

Figure 22:
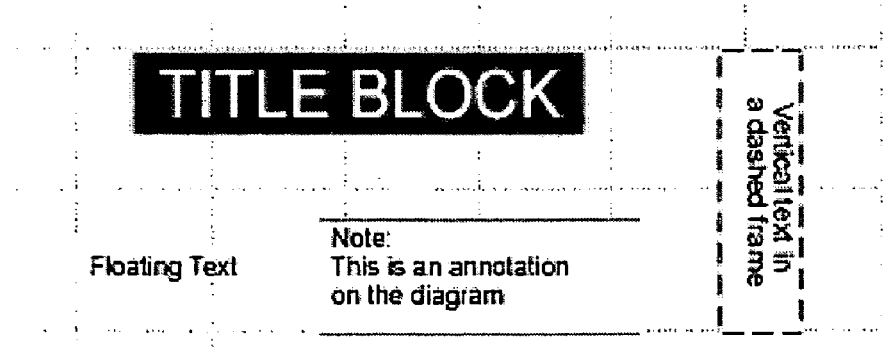

A Textbox pictogram is used for drawing text boxes with multiple lines of text. The textbox is automatically resized to fit its contents. Examples are depicted in FIG. 22.

Properties:

| fontSize | The textbox's font size | |
| --- | --- | --- |
| | Type: | Integer |
| | Default: | 90 |
| | Access: | read/write |
| | Remarks: | The font size is expressed as a percentage of the default font size (e.g., 50 means half-size font, 200 means double-size font, etc.). |
| textAlign | The textbox's alignment | |
| | Type: | Integer |
| | Default: | 90 |
| | Access: | read/write |
| | Remarks: | The alignment can be any one of the following values: |
| | | VALUE DESCRIPTION |
| | | START Align text along the left margin |
| | | MIDDLE Center text around the shape's middle |
| | | END Align text along the right margin |
| frameDash | The textbox's frame dash pattern | |
| | Type: | Integer |
| | Default: | none |
| | Access: | read/write |
| | Remarks: | This property controls the pattern of dashes and gaps used to stroke the textbox frame. The frameDash value can be either 'none' (indicating that the frame is to be drawn solid), or a list of whitespace-separated numbers that specify the lengths of alternating dashes and gaps. |

Groups

A group is a shape that can contain other shapes, including other groups. Operations performed on a group are performed on all its members as a whole. The group defines a new coordinates system for its member shapes, relative to its position and scale. Examples of pictograms for groups are provided below.

(1) Group

Figure 23:
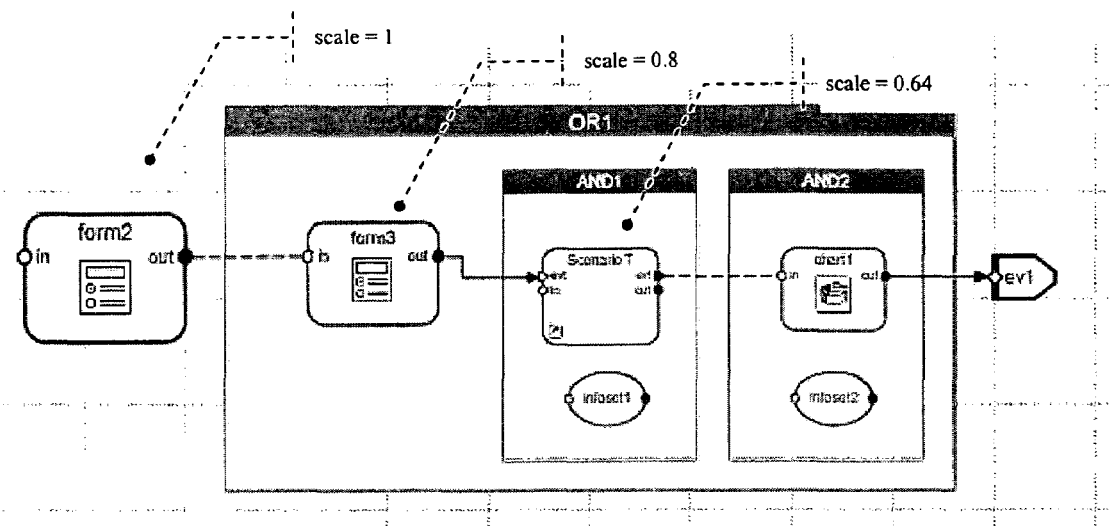

A Group pictogram has no specific layout. Therefore, the members of a Group pictogram are arranged using the same layout as defined by the owning diagram. However, other pictograms derived from Group may provide specialized layout methods of their own. Examples are depicted in FIG. 23.

Properties:

| | |
|---|---|
| scale | The group's scale |
| | Type: Float |
| | Default: 0.8 |
| | Access: read/write |
| | Remarks: The scale is a positive integer between 0 (exclusive) and 1 (inclusive), indicating the scale of the group's inner coordinates system (the group's contents) relative to the group's outer coordinates system (containing group or diagram). |
| collapsed | The group's expand/collapse flag |
| | Type: Boolean |
| | Default: false |
| | Access: read/write |
| | Remarks: This property indicates whether the group has been collapsed. When a group is collapsed it contents are hidden and its frame is shrank to the minimum size. |
| frameParts | The group frame's parts |
| | Type: SvgParts |
| | Default: { } |
| | Access: read-only |
| | Remarks: Use this property to define the graphical parts that draw the group's frame. See Polyshape for more details about this property. |
| members | The group's members collection |
| | Type: Formula |
| | Default: (none) |
| | Access: read-only |
| | Remarks: A dynamic formula that evaluates to the collection of member elements contained in this group. Typically, the formula will be simply a reference to a corresponding collection property defined in the meta-model. The collection can also be defined dynamically by invocation of a query method. |

(2) Tessellation

Figure 24:
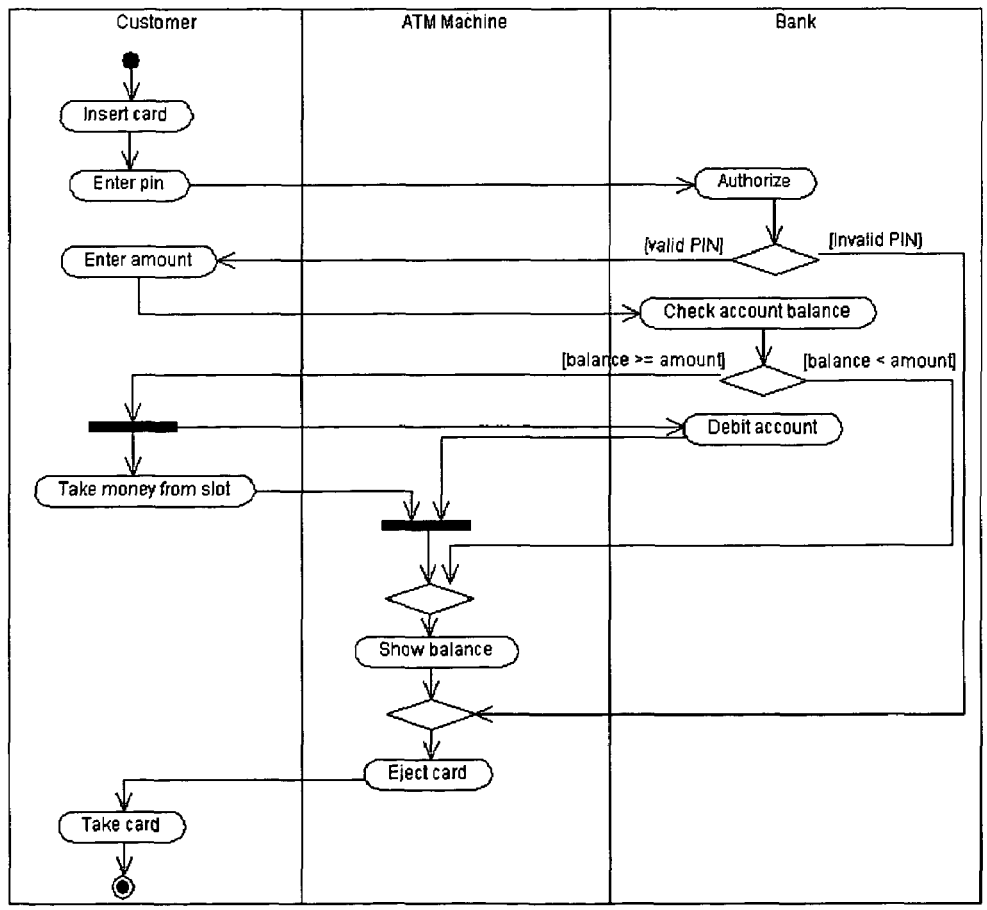

A Tessellation pictogram is a group that arranges its members so that they completely cover the group's contents area without overlaps. The members of a tessellation are usually all groups. The order of the members in a tessellation is important. Examples are depicted in FIG. 24.

Properties:

| | |
|---|---|
| layout | The tessellation's layout |
| | Type: Enum |
| | Default: COLUMNS |
| | Access: read/write |
| | Remarks: The tessellation's layout can be any one of the following values: |

| VALUE | DESCRIPTION |
|---|---|
| COLUMNS | Arrange the members in vertical columns |
| ROWS | Arrange the members in horizontal rows |
| QUADRANTS | Arrange the members (exactly 4) in four quadrants |
| T-SHAPE | Arrange the members (exactly 3) in a T-shape |

(3) Progression

Figure 25:
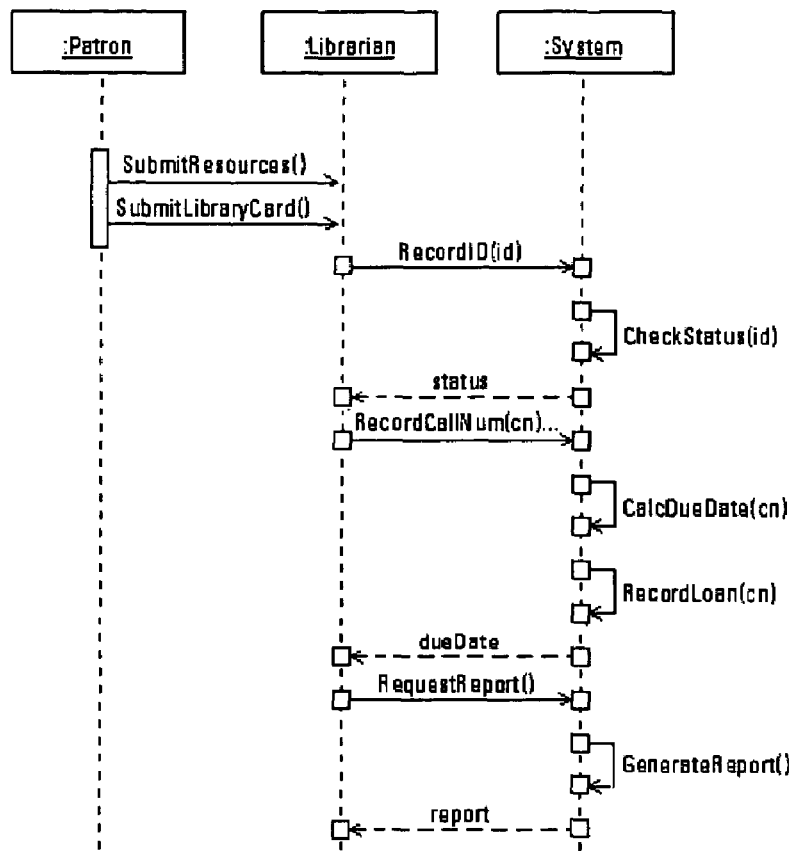

A Progression pictogram is a group that arranges its members along a time line. The order of the members in a progression is important. An example is depicted in FIG. 25.

Properties:

| | |
|---|---|
| layout | The progression's layout |
| | Type: Enum |
| | Default: COLUMNS |
| | Access: read/write |
| | Remarks: The progression's layout can be any one of the following values: |

| VALUE | DESCRIPTION |
|---|---|
| HORZ | Arrange the members along a horizontal line |
| VERT | Arrange the members along a vertical line |

Lines

A line is a directed path that connects two shape anchors (the line ends). The line's coordinates system is defined by the innermost group or diagram that contains both line ends. Examples of line pictograms are provided below.

(1) Line

The Line pictogram represents a straight line that is drawn directly from the source anchor to the target anchor.

| | |
|---|---|
| startArrow | The line's start arrow |
| | Type: Enum (see below) |
| | Default: (none) |
| | Access: read/write |
| endArrow | The line's end arrow |
| | Type: Enum (see below) |
| | Default: BLOCK FILLED |
| | Access: read/write |

Figure 26:
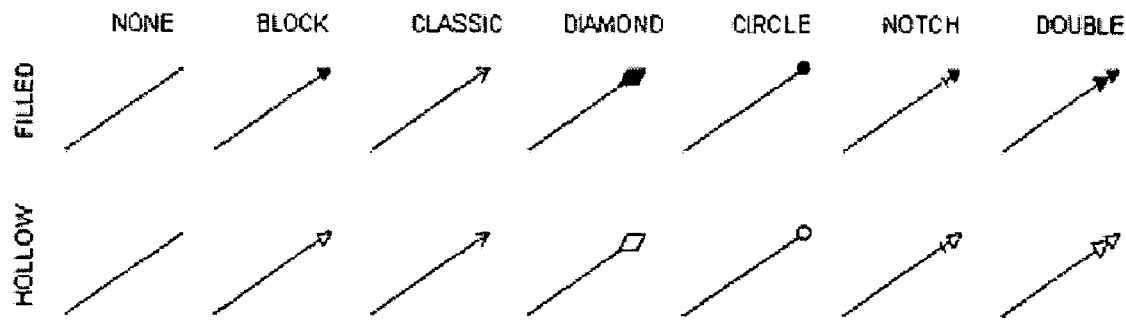

The start and end arrows can be any one of the combinations depicted in FIG. 26.

Figure 27:
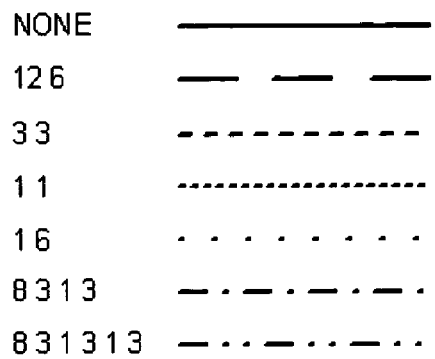
Figure 28:
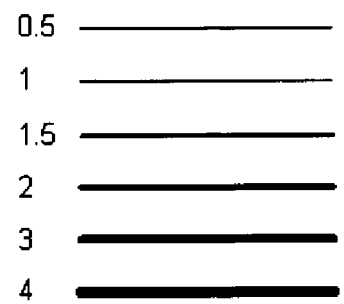
Figure 29:
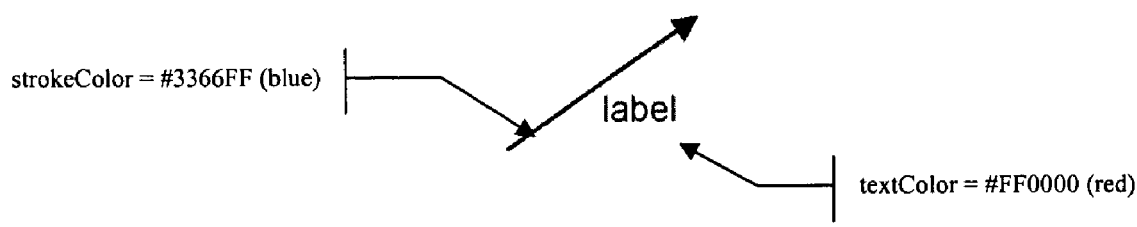

| | |
|---|---|
| lineDash | The line's dash pattern. Examples are depicted in FIG. 27. |
| | Type: String |
| | Default: (none) |
| | Access: read/write |
| | Remarks: The dash property controls the pattern of dashes and gaps used to stroke the line. The dash property value can be either 'none' (indicating that the line is to be drawn solid), or a list of whitespace-separated numbers that specify the lengths of alternating dashes and gaps. |
| lineDash | The line's stroke width. Examples are shown in FIG. 28. |
| | Type: Float |
| | Default: 1.25 |
| | Access: read/write |
| strokeColor | The line's stroke color |
| | Type: RGB |
| | Default: #718398 |
| | Access: read/write |
| | Remarks: The stroke color is the default color used for drawing the line |
| textColor | The line's text color |
| | Type: RGB |
| | Default: #546374 |
| | Access: read/write |
| | Remarks: The stroke color is the default color used for the line's text label |
| highlightColor | The line's highlight color |
| | Type: RGB |
| | Default: #FF9933 |
| | Access: read/write |
| | Remarks: The highlight color is the color used for highlighting the line when the mouse is moved over it |

Figure 30:
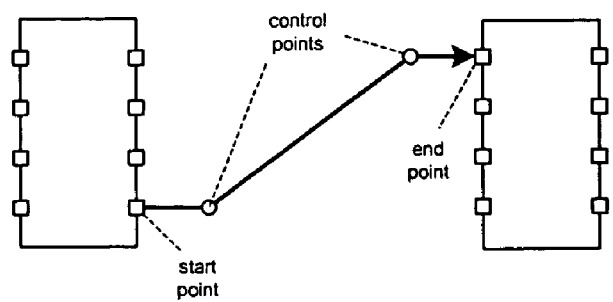

FIG. 30 illustrates the various line colors.

| | |
|---|---|
| controls | The line's control points |
| | Type: String |
| | Default: (none) |
| | Access: read/write |
| | Remarks: This property encodes the positions of the line control points. The exact encoding depends on the line type. |

(2) AngularLine

The AngularLine pictogram represents an angular line with two control points. An example is depicted in FIG. 30.

(3) CurvedLine

Figure 31:
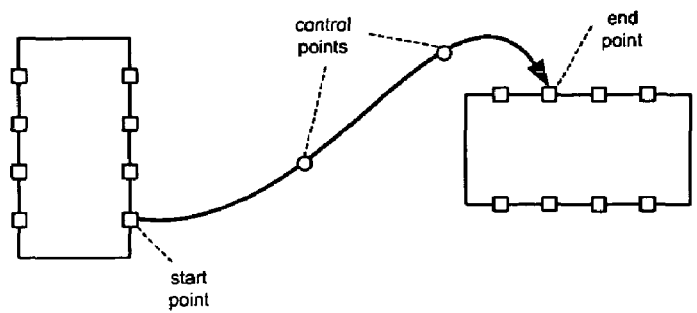

The CurvedLine pictogram represents a Bezier curve with two control points, as shown in FIG. 31.

(4) OrthogonalLine

Figure 32:
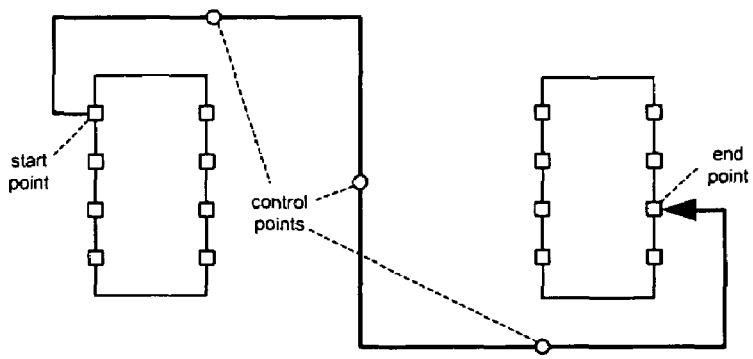

The OrthogonalLine pictogram represents a line drawn using only horizontal or vertical line segments. The orthogonal line is automatically routed around the shapes it is connected to. The number of control points in an orthogonal line varies depending on its route. An example is depicted in FIG. 32.

(5) Anchor

The Anchor pictogram represents a line connection point. Anchors are aggregated by shapes and are connected by lines.

Properties:

| | |
|---|---|
| type | The anchor type |
| | Type: Enum |
| | Default: SHAPE |
| | Access: read-only |
| | Remarks: The anchor's type can be any one of the following values: |
| | VALUE     DESCRIPTION |
| | SHAPE     The anchor is the entire shape |
| | NORTH     The anchor is the north shape edge |
| | SOUTH     The anchor is the south shape edge |
| | EAST     The anchor is the east shape edge |
| | WEST     The anchor is the west shape edge |
| | PIN     The anchor is a visual pin |

Figure 33:
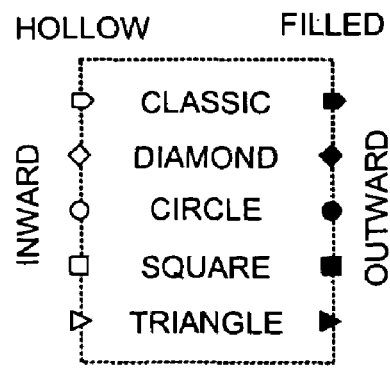
Figure 34:
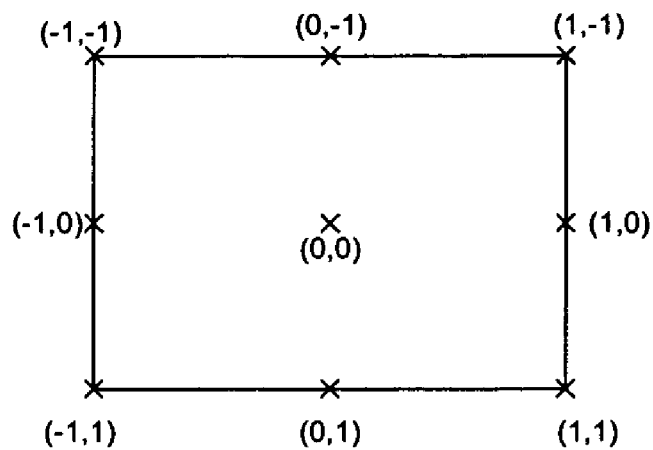
Figure 35:
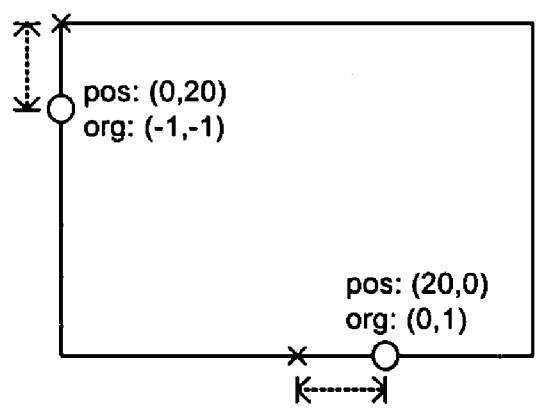

The remaining properties apply to anchors of type PIN:

| | |
|---|---|
| symbol | The pin's symbol. |
| | Type: Enum |
| | Default: input pins → CLASSIC HOLLOW INWARD |
| | output pins → CLASSIC FILLED OUTWARD |
| | Access: read/write |
| | Remarks: The visual symbol to use for drawing the pin. Can be any of the combinations of values depicted in FIG. 33. |
| color | The pin's color |
| | Type: RGB |
| | Default: (inherit) |
| | Access: read/write |
| | Remarks: By default, the pin inherits the color of its containing shape |
| org | The pin's origin |
| | Type: Point |
| | Default: {x: 0, y: 0} |
| | Access: read/write |
| | Remarks: Specifies the pin's origin in units relative to the containing shape's dimensions. An example is depicted in FIG. 34. |
| pos | The pin's position |
| | Type: Point |
| | Default: {x: 0, y: 0} |
| | Access: read/write |
| | Remarks: Specifies the pin's position relative to its origin. Example depicted in FIG. 35. |

An example of a set of pictograms and their associated properties is described above. Embodiments of the present invention decouple the model representation from the visual representation. As a result, the model and visual representations can be evolved separately, and by the most appropriate experts. For example, a meta-modeling expert can extend the model representation (for example, by adding new meta-model elements) without needing to become a graphics expert. The visual mapping from the model representation to the visual representation may already be available, or can be created in a very simple way. Similarly, a usability expert can refine and improve the visual appearance of an already existing meta-model without impacting the meta-model itself.

Embodiments of the present invention provide a generic visualization process that enables transforming any model representation (using possibly different modeling languages) to any visual representation. The visualization process is not tied down to any modeling representation type (e.g., not tied to any particular modeling domain format or language) or to any visual representation. Different visualization tools may be used to output or display the same model representation. Likewise, different model representations may be visualized using the same visualization tool.

The same model representation may be mapped to multiple visual representations. This enables displaying the model at different levels of details or with different perspectives for users with different roles. Because all visual representations are declaratively mapped to the same underlying model, the design-time tools can ensure that the different views on the model are kept in sync.

Different design tools may interpret the mapping between the model and visual representations, because the mapping is fully declarative and language independent. Therefore, it is possible to define the visual mapping once and then, without any additional implementation effort, achieve the same consistent model visualization in other different design-time tools that support this method. Whenever the modeling language is extended, the new elements will also become visible in all the supporting design-time tools without any additional effort.

In some embodiments of the present invention, the visual mapping itself be generated by automated tools, due to mapping being fully declarative. This enables tools that automate the development of a modeling language to provide also a visual representation of the generated meta-model elements. For example, a Visual Composer kit developer may be able to develop new meta-model elements using the kits development infrastructure in Eclipse, and then let the tools generate automatically the skeleton Visual Composer model classes, complete with their visual representation, so they are available for use in Visual Composer.

Figure 36:
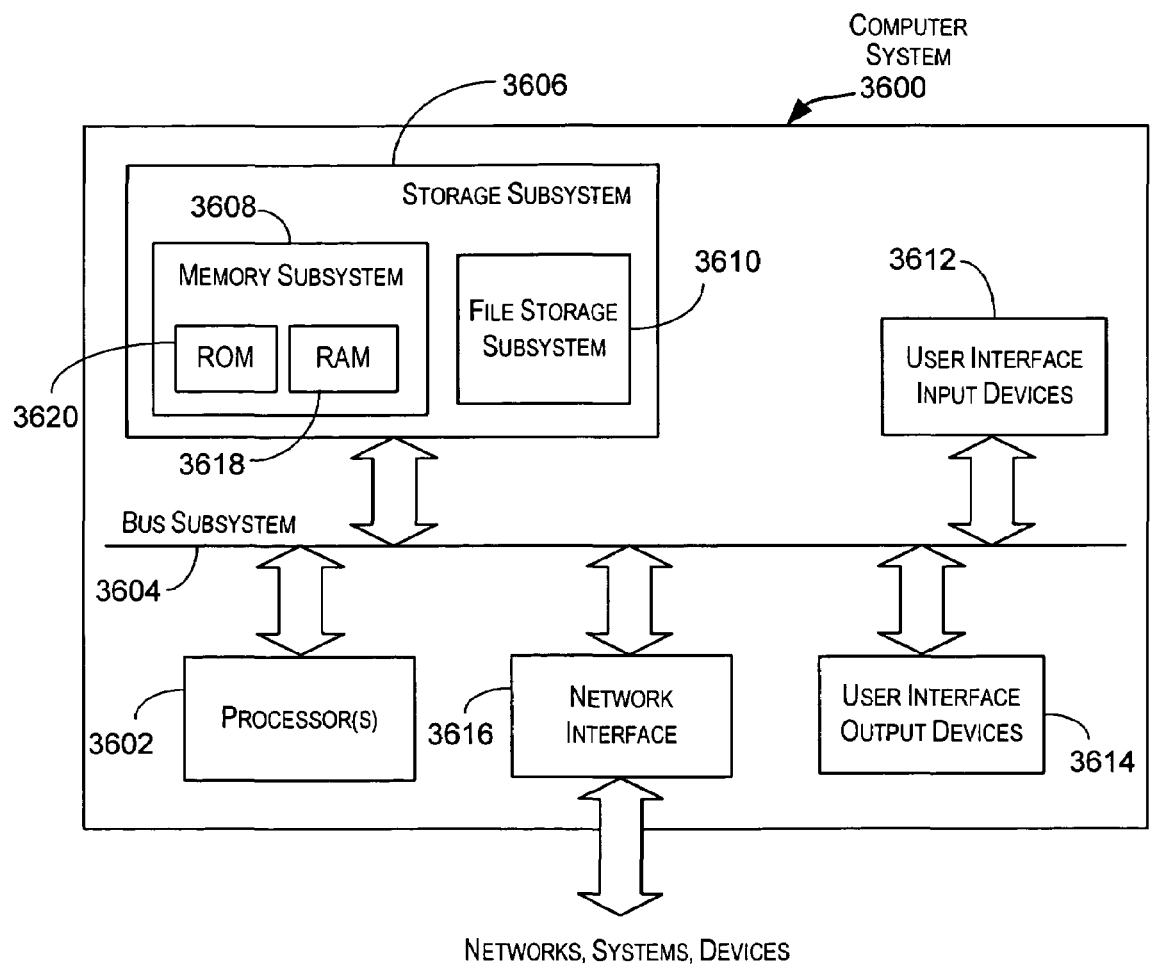
FIG. 36 is a simplified block diagram of a computer system that may be used to perform processing according to an embodiment of the present invention.

FIG. 36 is a simplified block diagram of a computer system 3600 that may be used to perform processing according to an embodiment of the present invention. As shown in FIG. 36, computer system 3600 includes a processor or processing engine 3602 that communicates with a number of peripheral devices via a bus subsystem 3604. These peripheral devices may include a storage subsystem 3606, comprising a memory subsystem 3608 and a file storage subsystem 3610, user interface input devices 3612, user interface output devices 3614, and a network interface subsystem 3616.

Bus subsystem 3604 provides a mechanism for letting the various components and subsystems of computer system 3600 communicate with each other as intended. Although bus subsystem 3604 is shown schematically as a single bus, alternative embodiments of the bus subsystem may utilize multiple busses.

Network interface subsystem 3616 provides an interface to other computer systems, networks, and devices. Network interface subsystem 3616 serves as an interface for receiving data from and transmitting data to other systems, networks, devices, etc. from computer system 3600.

User interface input devices 3612 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 3600. A user may use an input device to manipulate and make changes to the visual representation.

User interface output devices 3614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 3600. An output device may be used to output the visual representation to the user.

Storage subsystem 3606 may be configured to store the basic programming and data constructs that provide the functionality of the present invention. Software (code modules or instructions) that provides the functionality of the present invention may be stored in storage subsystem 3606. These software modules or instructions may be executed by processor(s) 3602. Storage subsystem 3606 may also provide a repository for storing data used in accordance with the present invention. Storage subsystem 3606 may comprise memory subsystem 3608 and file/disk storage subsystem 3610.

Memory subsystem 3608 may include a number of memories including a main random access memory (RAM) 3618 for storage of instructions and data during program execution and a read only memory (ROM) 3620 in which fixed instructions are stored. File storage subsystem 3610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 3600 can be of various types including a personal computer, a portable computer, a workstation, a network computer, a mainframe, a kiosk, or any other data processing system. Due to the ever-changing nature of computers and networks, the description of computer system 3600 depicted in FIG. 36 is intended only as a specific example for purposes of illustrating the preferred embodiment of the computer system. Many other configurations having more or fewer components than the system depicted in FIG. 36 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer of generating a visual representation for a model representation, the method comprising:

identifying a set of one or more model elements in the model representation;

automatically generating at a data processing system an abstract representation for the model representation using a set of mapping rules, each mapping rule in the set of mapping rules providing a mapping of a model element type to a visual element type, the abstract representation comprising a set of one or more visual elements and associated one or more properties, the set of visual elements determined based upon the set of model elements and the set of mapping rules;

automatically generating a first visual representation for a first graphics engine, the first graphics engine being a first type of graphics engine, based upon the abstract representation, the first visual representation comprising a set of one or more graphic elements determined based upon (i) the set of visual elements and their associated properties and (ii) the first type of graphics engine;

displaying the first visual representation to a first user via a first output device;

automatically generating a second visual representation for a second graphics engine, the second graphics engine being a second type of graphics engine distinct from the first type, based upon the abstract representation, the second visual representation comprising a set of one or more graphic elements determined based upon (i) the set of visual elements and their associated properties and (ii) the second type of graphics engine, at least one of the graphic elements in the second visual representation being different than at least one of the graphic elements in the first visual representation because of a difference in graphical ability between the first and second types of graphics engines; and wherein automatically generating the first abstract representation comprises:

identifying a first model element of a first type from the set of model elements;

automatically determining a first mapping rule from the set of mapping rules that maps the first type to a first visual element type; and automatically creating a visual element of the first visual element type identified by the first mapping rule for the first model element.

2. The method of claim 1 further comprising:
receiving user input indicating a change to the first visual representation;
making a change to the abstract representation to reflect the change to the first visual representation; and
updating the second visual representation based on the change to the abstract representation.

3. The method of claim 2 farther comprising:
making a change to the model representation based upon the change made to the abstract representation to reflect the change made to the first visual representation.

4. The method of claim 1 wherein the set of mapping rules that is used to generate the abstract representation depends upon a type of the model representation.

5. The method of claim 1 wherein generating the first visual representation comprises:
determining one or more graphic elements for a first visual element from the set of visual elements based upon a type of the first visual element and one or more properties associated with the first visual element.

6. The method of claim 1 wherein generating the first visual representation comprises:
determining the first type of graphics engine associated with the first output device for outputting the first visual representation.

7. The method of claim 6 wherein the first type of graphics engine is at least one of a scalable vector graphics engine, a vector graphics rendering engine, or a Graphic Editing Framework engine.

8. A method performed by a tool executing on a computer system, the method comprising:
receiving input identifying a model representation;
processing the model representation to identify a set of one or more model elements;
determining a set of mapping rules to be used for the model representation, each mapping rule in the set of mapping rules providing a mapping of a model element type to a pictogram type;
automatically mapping at the computer system each model element in the set of model elements to a pictogram using the set of mapping rules to generate a set of one or more pictograms;
setting one or more properties associated with the one or more pictograms in the set of pictograms;
generating a first visual representation to be displayed via a first type of graphics engine, based upon the set of pictograms and their associated properties, the first visual representation comprising a set of one or more graphic elements;
outputting a signal associated with the first visual representation to a first user display device;
generating a second visual representation to be displayed via a second type of graphics engine, based upon the set of pictograms and their associated properties, the second visual representation comprising a set of one or more graphic elements; and
outputting a signal associated with the second visual representation to a second user display device, at least one of the graphic elements in the second visual representation being different than at least one of the graphic elements in the first visual representation because of a difference in graphical ability between the first and second types of graphics engines; and
wherein automatically generating the first abstract representation comprises:
identifying a first model element of a first type from the set of model elements;
automatically determining a first mapping rule from the set of mapping rules that maps the first type to a first visual element type; and
automatically creating a visual element of the first visual element type identified by the first mapping rule for the first model element.

9. The method of claim 8 wherein generating the first visual representation comprises:
determining the first type graphics engine; and
generating the first visual representation based upon the first type of graphics engine.

10. A system for generating visual representations for a model representation, the system comprising:
a memory storing a set of one or more mapping rules, the set of mapping rules mapping of a set of model element types to a set of visual element types;
an output port coupled to the processing engine to provide one of the first and second visual representations to a display monitor; and
wherein automatically generating the first abstract representation comprises;
Identifying a first model element of a first type from the set of model elements;
automatically determining a first mapping rule from the set of mapping rules that maps the first type to a first visual element type; and
automatically creating a visual element of the first visual element type identified by the first mapping rule for the first model element.

11. The system of claim 10 wherein the processing engine is further configured to:
receive user input indicating a change to the first visual representation; and
make a change to the abstract representation to reflect the change to the first visual representation.

12. The system of claim 11 wherein the processing engine is further configured to:
make a change to the model representation based upon the change made to the abstract representation to reflect the change made to the first visual representation.

13. The system of claim 10 wherein the set of mapping rules that is used by the processing engine to generate the abstract representation depends upon a type of the model representation.

14. The system of claim 10 wherein the processing engine is configured to generate the first visual representation by:
determining one or more graphic elements for a first visual element from the set of visual elements based upon a type of the first visual element and one or more properties associated with the first visual element.

15. The system of claim 10 wherein the processing engine is configured to generate the first visual representation by:
determining the first type graphics engine for outputting the first visual representation; and
generating the first visual representation based upon the first type of graphics engine.

16. The system of claim 15 wherein the first type of graphics engine is at least one of a scalable vector graphics engine, a vector graphics rendering engine, or a Graphic Editing Framework engine.

17. A system for generating visual representations, the system comprising:
an input device;
a processing engine coupled to the input device, the processing engine configured to:
receive input via the input device identifying a model representation;

process the model representation to identify a set of one or more model elements;

determine a set of mapping rules to be used for the model representation, each mapping rule in the set of mapping rules providing a mapping of a model element type to a pictogram type, a processing engine coupled to the memory, the processing engine configured to:

identify a set of one or more model elements in the model representation; generate an abstract representation for the model representation using the set of mapping rules, the abstract representation comprising a set of one or more visual elements and associated one or more properties, the set of visual elements determined based upon the set of model elements and the set of mapping rules;

generate a first visual representation based upon the abstract representation, the first visual representation being generated for a first type of graphics engine and comprising a set of one or more graphic elements determined based upon (i) the set of visual elements and their associated properties and (ii) the first type of graphics engine; and generate a second visual representation based upon the abstract representation, the second visual representation being generated for a second type of graphics engine, different than the first type of graphics engine, and comprising a set of one or more graphic elements determined based upon (i) the set of visual elements and their associated properties and (ii) the second type of graphics engine, at least one of the graphic elements in the second visual representation being different than at least one of the graphic elements in the first visual representation because of a difference in graphical ability between the first and second types of graphics engines; and map each model element in the set of model elements to a pictogram using the set of mapping rules to generate a set of one or more pictograms;

set one or more properties associated with the one or more pictograms in the set of pictograms;

generate a first visual representation to be displayed via a first type of graphics engine, based upon the set of pictograms and their associated properties, the first visual representation comprising a set of one or more graphic elements; and generate a second visual representation to be displayed via a second type of graphics engine, based upon the set of pictograms and their associated properties, the second visual representation comprising a set of one or more graphic elements, at least one of the graphic elements in the second visual representation being different than at least one of the graphic elements in the first visual representation because of a difference in graphical ability between the first and second types of graphics engines; and an output port coupled to the processor to provide a signal associated with the first visual representation; and wherein automatically generating the first abstract representation comprises:

Identifying a first model element of a first type from the set of model elements;

automatically determining a first mapping rule from the set of mapping rules that maps the first type to a first visual element type; and automatically creating a visual element of the first visual element type identified by the first mapping rule for the first model element.

18. The system of claim 17 wherein the processing engine generates the first visual representation by:

determining the first type graphics engine for outputting the first visual representation; and generating the first visual representation based upon the first type of graphics engine.

19. The system of claim 17 further comprising an output device coupled to the output port and configured to receive the signal associated with the first visual representation and to display the first visual representation.

20. A storage subsystem storing a plurality of instructions for controlling a data processor to generate visual representations for a model representation, the plurality of instructions comprising:

instructions that cause the data processor to identify a set of one or more model elements in the model representation;

instructions that cause the data processor to automatically generate an abstract representation for the model representation using a set of mapping rules, each mapping rule in the set of mapping rules providing a mapping of a model element type to a visual element type, the abstract representation comprising a set of one or more visual elements and associated one or more properties, the set of visual elements determined based upon the set of model elements and the set of mapping rules;

instructions that cause the data processor to automatically generate a first visual representation for a first type of graphics engine based upon the abstract representation, the first visual representation comprising a set of one or more graphic elements determined based upon (i) the set of visual elements and their associated properties and (ii) the first type of graphics engine;

instructions that cause the data processor to automatically generate a second visual representation for a second type of graphics engine, different than the first type of graphics based upon the abstract representation, the second visual representation comprising a set of one or more graphic elements determined based upon (i) the set of visual elements and their associated properties and (ii) the second type of graphics engine, at least one of the graphic elements in the second visual representation being different than at least one of the graphic elements in the first visual representation because of a difference in graphical ability between the first and second types of graphics engines; and instructions that cause the data processor to output a signal associated with the first visual representation; and wherein automatically generating the first abstract representation comprises:

identifying a first model element of a first type from the set of model elements;

automatically determining a first mapping rule from the set of mapping rules that maps the first type to a first visual element type; and automatically creating a visual element of the first visual element type identified by the first mapping rule for the first model element.

21. A storage subsystem storing a plurality of instructions for controlling a data processor to generate visual representations, the plurality of instructions comprising:

instructions that cause the data processor to receive input identifying a model representation;

instructions that cause the data processor to process the model representation to identify a set of one or more model elements;

instructions that cause the data processor to determine a set of mapping rules to be used for the model representation, each mapping rule in the set of mapping rules providing a mapping of a model element type to a pictogram type;

instructions that cause the data processor to map each model element in the set of model elements to a pictogram using the set of mapping rules to generate a set of one or more pictograms;

instructions that cause the data processor to set one or more properties associated with the one or more pictograms in the set of pictograms;

instructions that cause the data processor to generate a first visual representation for a first type of graphics engine based upon the set of pictograms and their associated properties, the first visual representation comprising a first set of one or more graphic elements; and instructions that cause the data processor to generate a second visual representation for a second type of graphics engine, of a type different than the first type of graphics engine, based upon the set of pictograms and their associated properties, the second visual representation comprising a second set of one or more graphic elements, wherein the second set of one or more graphic elements includes at least one graphic element not included in the first set because of a difference in graphical ability between the first and second types of graphics engines; and wherein automatically generating the first abstract representation comprises:

identifying a first model element of a first type from the set of model elements;

automatically determining a first mapping rule from the set of mapping rules that maps the first type to a first visual element type; and automatically creating a visual element of the first visual element type identified by the first mapping rule for the first model element.

* * * * *